(12) United States Patent
Nagayasu

(10) Patent No.: US 9,827,812 B2
(45) Date of Patent: Nov. 28, 2017

(54) PNEUMATIC TIRE

(71) Applicant: The Yokohama Rubber Co., LTD., Minato-ku, Tokyo (JP)

(72) Inventor: Masaaki Nagayasu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 264 days.

(21) Appl. No.: 14/411,322

(22) PCT Filed: Jun. 3, 2013

(86) PCT No.: PCT/JP2013/065378
§ 371 (c)(1),
(2) Date: Dec. 24, 2014

(87) PCT Pub. No.: WO2014/002697
PCT Pub. Date: Jan. 3, 2014

(65) Prior Publication Data
US 2015/0191051 A1    Jul. 9, 2015

(30) Foreign Application Priority Data

Jun. 29, 2012  (JP) .................. 2012-147162

(51) Int. Cl.
*B60C 11/12*    (2006.01)
*B60C 11/11*    (2006.01)
(Continued)

(52) U.S. Cl.
CPC ............ *B60C 11/1204* (2013.01); *B60C 5/00* (2013.01); *B60C 11/1218* (2013.01);
(Continued)

(58) Field of Classification Search
CPC ............ B60C 11/0306; B60C 11/1218; B60C 2011/1213; B60C 11/11; B60C 11/1204;
(Continued)

(56) References Cited

U.S. PATENT DOCUMENTS

2005/0121124 A1    6/2005  Tsubono
2010/0206447 A1    8/2010  Ohashi et al.
(Continued)

FOREIGN PATENT DOCUMENTS

CA        2 783 999       8/2011
DE    10 2006 058 086     6/2008
(Continued)

OTHER PUBLICATIONS

International Search Report for International Application No. PCT/JP2013/065378 dated Sep. 17, 2013, 8 pages, Japan.

*Primary Examiner* — Eric Hug
(74) *Attorney, Agent, or Firm* — Thorpe North & Western

(57) ABSTRACT

A pneumatic tire includes blocks arranged in the tread center region that is X % (30≤X≤70) of the tread contact width TW with the tire equator C as center are formed elongated in the tire circumferential direction so that the block ratio is not less than 1.5. At least one end in the longitudinal direction of the sipes provided in the blocks connects to a longitudinal groove. A protrusion and a recess that can engage with each other are provided on the sipe wall surfaces that face each other constituting the sipes, at the end portion in the longitudinal direction of the sipes that connect with the longitudinal groove.

19 Claims, 17 Drawing Sheets

(51) Int. Cl.
 *B60C 5/00* (2006.01)
 *B60C 11/03* (2006.01)
(52) U.S. Cl.
 CPC ...... *B60C 11/1236* (2013.01); *B60C 11/1263* (2013.01); *B60C 11/0306* (2013.01); *B60C 11/11* (2013.01); *B60C 2011/1209* (2013.01); *B60C 2011/1213* (2013.01)
(58) Field of Classification Search
 CPC ......... B60C 2011/1209; B60C 11/1236; B60C 2011/133; B60C 2011/1338; B60C 2011/1227; B60C 2011/1259; B60C 11/1263; B60C 11/1268
 USPC .............................. 152/209.21, 209.18, 902
 See application file for complete search history.

(56) References Cited

U.S. PATENT DOCUMENTS

| | | |
|---|---|---|
| 2010/0307651 A1 | 12/2010 | Castellini |
| 2011/0277896 A1 | 11/2011 | Nagayasu |
| 2011/0315289 A1 | 12/2011 | Ohashi |
| 2012/0118454 A1* | 5/2012 | Nagayasu ........... B60C 11/0306 152/209.8 |
| 2012/0180920 A1 | 7/2012 | Nagayasu |

FOREIGN PATENT DOCUMENTS

| | | | |
|---|---|---|---|
| JP | H09-094829 | | 4/1997 |
| JP | H10-080923 | | 3/1998 |
| JP | 3180160 | | 6/2001 |
| JP | 2005-162058 | | 6/2005 |
| JP | 2007-137110 | * | 6/2007 |
| JP | 2010-188922 | | 9/2010 |
| JP | 4831723 | | 12/2011 |
| JP | 2012-006444 | | 1/2012 |
| JP | 2012-041024 | | 3/2012 |
| JP | 4894968 | | 3/2012 |
| JP | 2012-121542 | | 6/2012 |
| WO | WO 99/48707 | * | 3/1998 |
| WO | WO 2009/077807 | | 6/2009 |
| WO | WO 2011/036540 | * | 3/2011 |
| WO | WO 2011/091870 | | 8/2011 |

* cited by examiner

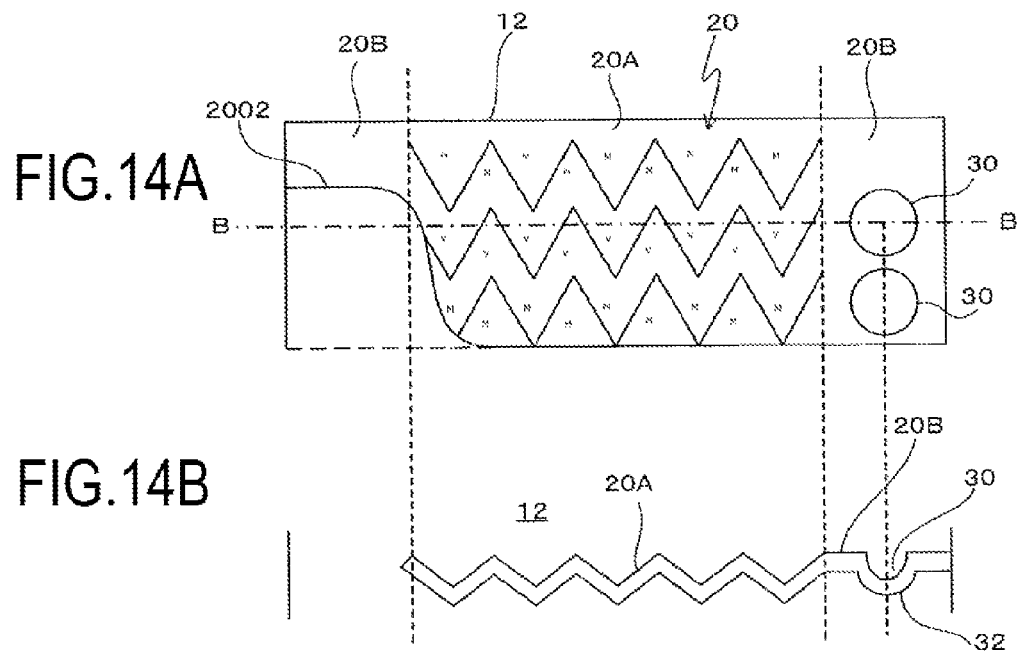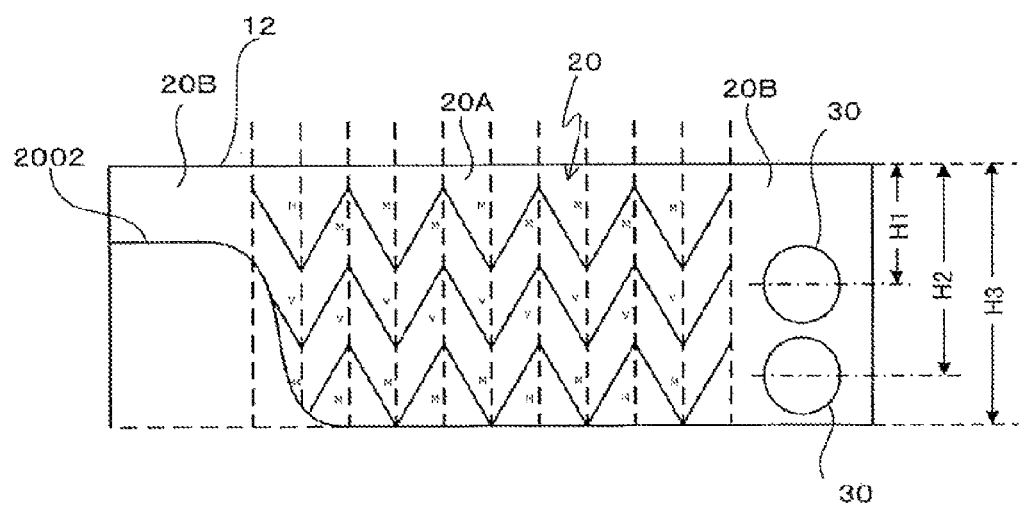

PNEUMATIC TIRE

TECHNICAL FIELD

The present technology relates to a pneumatic tire, and more specifically relates to a pneumatic tire that has the advantage that its traction performance (driving force transmission performance) is improved on snowy and icy road surfaces and wet road surfaces.

BACKGROUND

Tread patterns in which a plurality of sipes is disposed in a tire pattern in order to enhance braking performance on ice of studless tires are known. Also, in recent years, there is a tendency toward increasing the number of sipes. However, sipe density is increased as a result of increasing the number of sipes, and while this leads to an increase in the number of edges, it also leads to the problems of the overall rigidity of the block declining and braking performance on ice declining. Therefore, technology has been proposed in which collapse of the portions of a block that are sandwiched by sipes is minimized and the decline of block rigidity is reduced by disposing recesses and protrusions within the sipes (Japanese Patent No. 3180160).

On the other hand, focusing on steering stability on dry road surfaces and traction performance on snowy and icy road surfaces and wet road surfaces, with only recesses and protrusions within the sipes, it is not possible to increase the traction performance on snowy and icy road surfaces and wet road surfaces while maintaining steering stability on dry road surfaces.

SUMMARY

The present technology provides a pneumatic tire that is advantageous in improving the traction performance (driving force transmission performance) on snowy and icy road surfaces and wet road surfaces, while maintaining steering stability on dry road surfaces.

The present technology provides a pneumatic tire in which a plurality of longitudinal grooves is provided on the tread surface extending in the tire circumferential direction at intervals in the tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein the blocks arranged in a tread center region of X % of the tread contact width ($30 \leq X \leq 70$) with the tire equator as center have a block ratio, which is the ratio of the dimension in the tire longitudinal direction to the dimension in the tire width direction, of not less than 1.5 so that they are formed elongated in the tire circumferential direction, at least one end in the longitudinal direction of the sipes provided in the blocks arranged in the tread center region connects to a longitudinal groove, and at one end in the longitudinal direction of the sipes that connect with the longitudinal groove, a protrusion and a recess that can engage with each other are provided in the sipe wall surfaces that face each other constituting the sipe.

The blocks arranged in the tread center region of 30% to 70% of the tread contact width TW with the tire equator as center and which are not affected by lug grooves provided in the tread shoulder regions have a block ratio of not less than 1.5, so the rigidity of the blocks is maintained, and the traction performance on snowy and icy road surfaces and wet road surfaces is improved, while maintaining the steering stability on dry road surfaces.

Also, in order to effectively exhibit the edge effect and water drainage performance while maintaining the block rigidity, one end in the longitudinal direction of the sipes provided in the blocks are connected to a longitudinal groove, and by providing a protrusion and recess that can engage with each other at the end of the sipe that connects to this longitudinal groove, the steering stability on dry road surfaces is maintained, and, the traction performance on snowy and icy road surfaces and wet road surfaces is improved.

BRIEF DESCRIPTION OF THE DRAWINGS

FIGS. 14A and 14B are explanatory views showing a worn block of the pneumatic tire according to the fourth embodiment, FIG. 14A is the same as FIG. 13B, and FIG. 14B is a plan view of the tread surface at the line BB in FIG. 14A when the tire is worn;

FIG. 15 is a view showing the relationship between the depth to the protrusions and recesses from the tread surface and the depth to the bottom surface of the sipes from the tread surface.

DETAILED DESCRIPTION

First Embodiment

Figure 1:
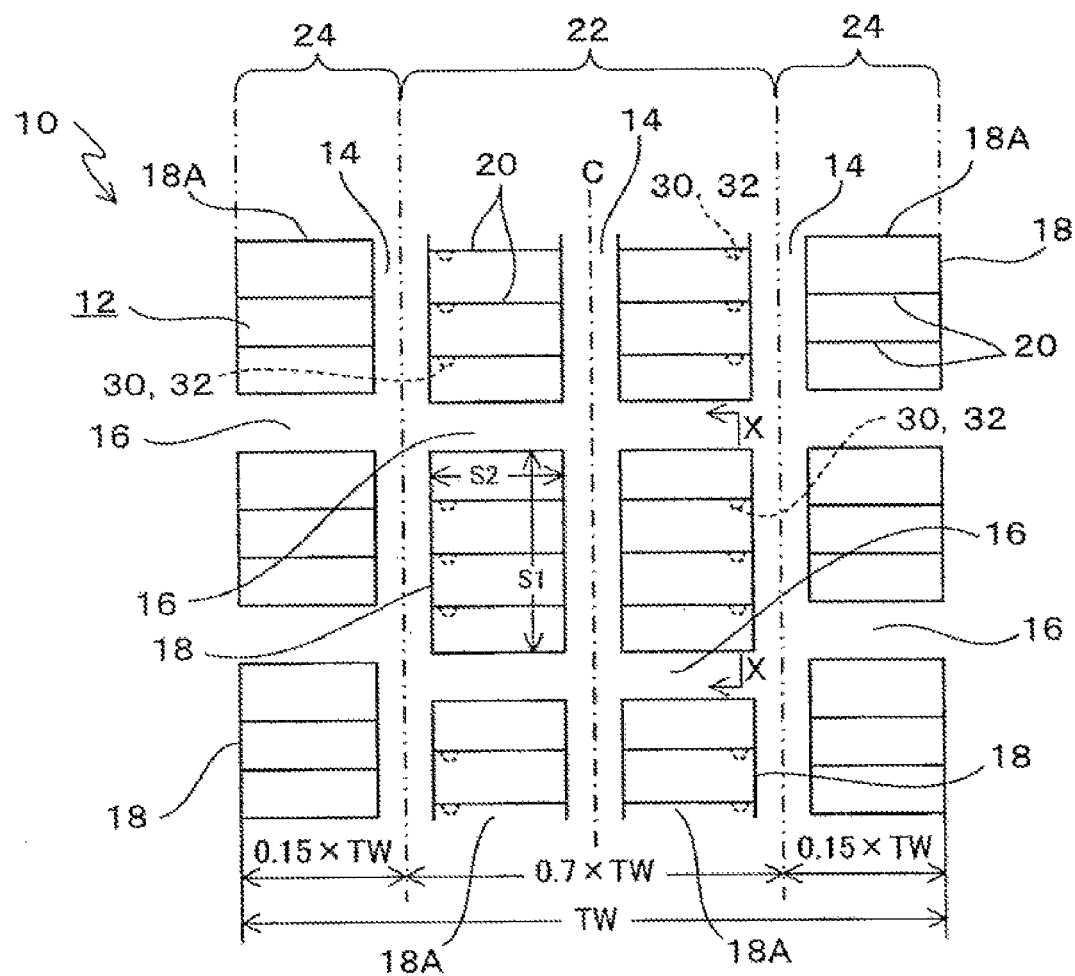
FIG. 1 is a developed view showing the tread pattern of a pneumatic tire according to a first embodiment.
Figure 2:
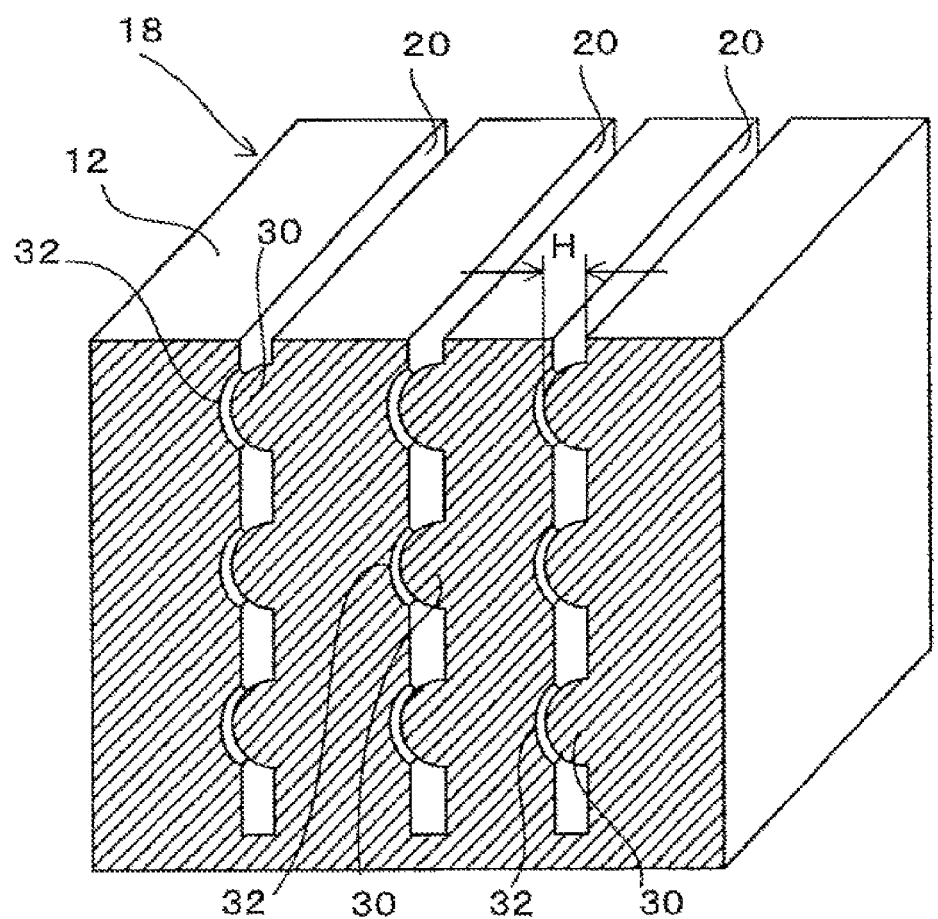
FIG. 2 is a cross-sectional view of a block that is sectioned at the protrusions and recesses.
Figure 3:
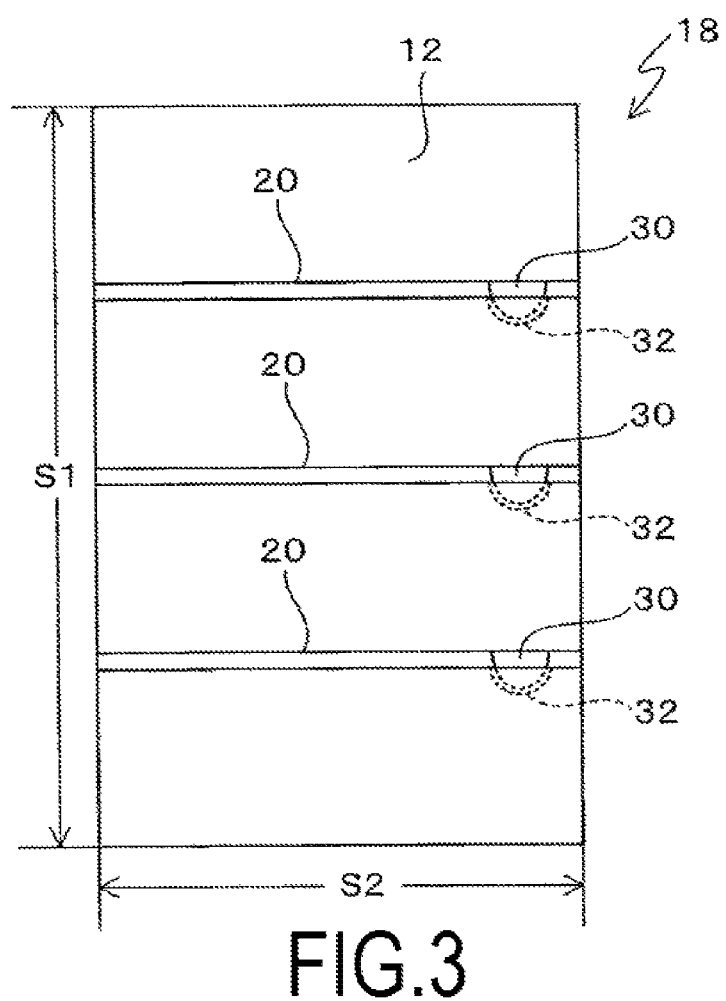
FIG. 3 is a plan view of a block.

As shown in FIG. 1, a plurality of longitudinal grooves 14 extending in the tire circumferential direction and a plurality of lateral grooves 16 that intersect the longitudinal grooves 14 are provided in a tread surface 12 of a pneumatic tire (in this embodiment a studless tire) 10, and a plurality of blocks 18 is partitioned by the longitudinal grooves 14 and the lateral grooves 16 in the tread surface 12. Also, a plurality of rows of blocks 18A extending in the tire circumferential direction is provided at intervals in the tire width direction. As shown in FIGS. 2 and 3, a plurality of sipes 20 extending in the tire width direction is provided at intervals in the tire circumferential direction in the tread surface 12 of the blocks 18.

The tread contact patch where the tread surface 12 contacts the road surface includes a tread center region 22 located in the center in the tire width direction, and tread shoulder regions 24 on both sides thereof. As shown in FIGS. 1 and 3, the blocks 18 of the tread center region 22 that is X % (30≤X≤70) of the tread contact width TW with the tire equator C as center are formed with the block ratio (S1/S2), which is the ratio of the dimension S1 in the tire circumferential direction to the dimension S2 in the tire width direction, of not less than 1.5 so that they are formed elongated in the tire circumferential direction.

In the present embodiment, as shown in FIG. 1, the tread center region 22 is a region 70% of the tread contact width TW with the tire equator C as center, and the tread shoulder regions 24 on both sides of the tread center region 22 are regions each 15% of the tread contact width TW. Therefore, in the present embodiment, the blocks 18 that constitute the two rows of blocks 18A on both sides of the tire equator C are considered.

In this case, the reason the blocks 18 arranged in the tread center region of not more than 70% of the tread contact width TW with the tire equator C as center are considered is because the blocks 18 arranged in this region are not affected by lug grooves provided in the tread shoulder regions 24, which has the advantage that the steering stability on dry road surfaces is maintained, and has the advantage that the traction performance on snowy and icy road surfaces and wet road surfaces is improved.

Also, the reason the block ratio (S1/S2) is not less than 1.5 is to ensure the rigidity of the blocks 18, so the traction performance on snowy and icy road surfaces and wet road surfaces is improved, while maintaining the steering stability on dry road surfaces. When the block ratio (S1/S2) is not less than 2.0, the length of the blocks 18 is increased thereby ensuring the rigidity of the blocks 18 in the tread center region 22, which is more advantageous in terms of maintaining the steering stability on dry road surfaces, and, is more advantageous in terms of improving the traction performance on snowy and icy road surfaces and wet road surfaces due to the sipes 20. When the block ratio (S1/S2) exceeds 4.0, the effect on the steering stability on dry road surfaces and the traction performance on snowy and icy road surfaces and wet road surfaces does not change.

For example, the longest block 18 in the circumferential direction to which the present technology is applied is about ½ the outer periphery in the tread surface 12 because there are lateral grooves at both ends in the direction that the block 18 extends, and taking into consideration tire uniformity and so on, so the upper limit value of the block ratio (S1/S2) varies depending on the tire diameter, becoming larger the larger the diameter of the tire.

In this case, the tread contact width TW (tire ground contact width TW) refers to the maximum width in the tire width direction of the footprint (tread contact patch) of the region where the tread surface 12 of the pneumatic tire contacts the road surface, when the pneumatic tire is installed on a regular rim and filled with regular inner pressure and 70% of a regular load is applied.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

Preferably the width of the sipes 20 is not less than 0.3 mm and not more than 1.5 mm in order to effectively exhibit the edge effect and water drainage performance.

In the present embodiment, the sipes 20 are straight line sipes with no amplitude when viewed from the tread surface 12, formed so that the sipe wall surfaces that face each other are planar. The shape of the sipes 20 when viewed from the tread surface 12 is not limited to a straight line shape, but may extend in a zigzag shape, and the shape in the longitudinal direction may be any shape. Also, the shape of the sipes 20 in the depth direction is not limited to a straight line extending normal to the tread surface 12, and it may extend from the tread surface 20 towards the bottom of the sipes 20 while curving.

Figure 4:
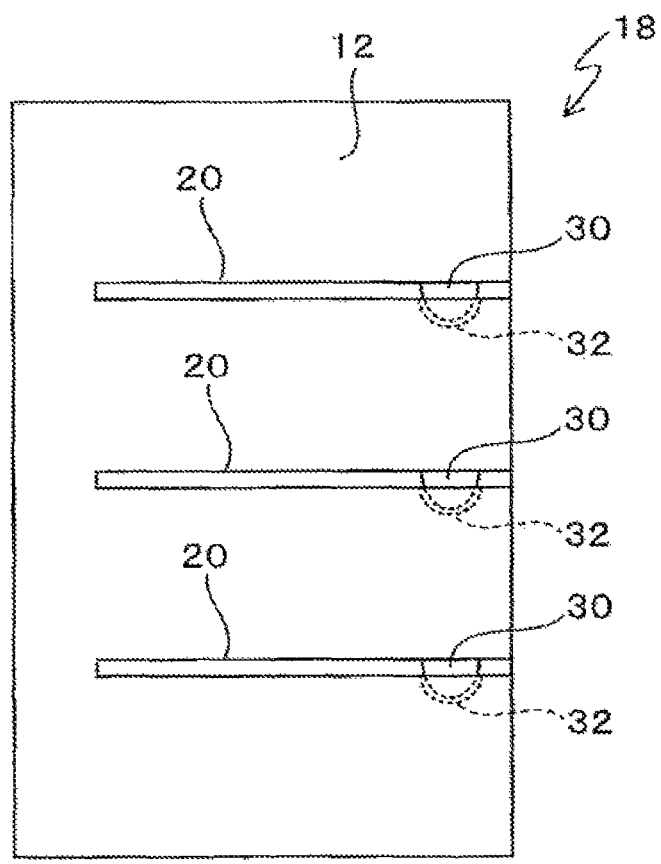
FIG. 4 is a plan view of a block in which the sipes are closed at one end in the longitudinal direction.

In order to effectively exhibit the edge effect and water drainage performance while ensuring the rigidity of the blocks 18, at least one end in the longitudinal direction of the sipes 20 provided in the blocks 18 arranged in the tread center region 22 connect to a longitudinal groove 14. The other end in the longitudinal direction of the sipes 20 may connect to a longitudinal groove 14 as shown in FIGS. 1 to 3, or may be closed, as shown in FIG. 4.

A protrusion 30 and a recess 32 that can engage with each other are provided on the sipe wall surfaces that face each other constituting the sipes 20, at the end in the longitudinal direction of the sipes 20 that connect with a longitudinal groove 14. A plurality of the protrusions 30 and the recesses 32 is provided at intervals in the depth direction of the sipes 20, and as shown in FIG. 2, in the present embodiment three are provided.

By having the protrusions 30 and recesses 32 engage with each other, collapse of the portions of the blocks that are sandwiched by the sipes is reduced, which is advantageous for maintaining the steering stability on dry road surfaces, and increasing the traction performance by the sipes 20 on snowy and icy road surfaces and wet road surfaces.

Also, by providing the plurality of protrusions 30 and recesses 32 at intervals in the depth direction of the sipes 20, the rigidity of the blocks 18 is maintained at the same level from the time of a new product until after there is tire wear, so the steering stability is maintained on dry road surfaces, and, the traction performance on snowy and icy road surfaces and wet road surfaces is improved by the sipes 20.

In some cases only one protrusion 30 and recess 32 is provided in the depth direction of the sipes 20, depending on the size of the protrusion 30 and recess 32, or, depending on the depth of the sipes 20.

The protrusion 30 has height in the direction normal to the sipe wall surface, and preferably the height H of the protrusion 30 is not less than 0.5 mm and not more than 3 mm, as shown in FIG. 2, from the viewpoint of effectively reducing collapse of the block portions, and ensuring the edge effect, in other words, from the viewpoint of maintaining the steering stability on dry road surfaces, and improving the traction performance on snowy and icy road surfaces and wet road surfaces. This is because when the height H of the protrusion 30 is less than 0.5 mm, the effect of reduction of collapse of the block 18 portions is reduced, and, when the height H of the protrusion 30 exceeds 3 mm, the edge effect and the water drainage performance is reduced.

As shown in FIGS. 1 to 3, the protrusion 30 may have a hemispherical shape, or, the portion projecting from the sipe wall surface may have a cylindrical shape with a hemispherical shape on the tip, in other words, the protrusions 30 and the recesses 32 may have any shape provided they engage with other when the block portions collapse, and collapse of the blocks 18 is reduced.

Figure 5:
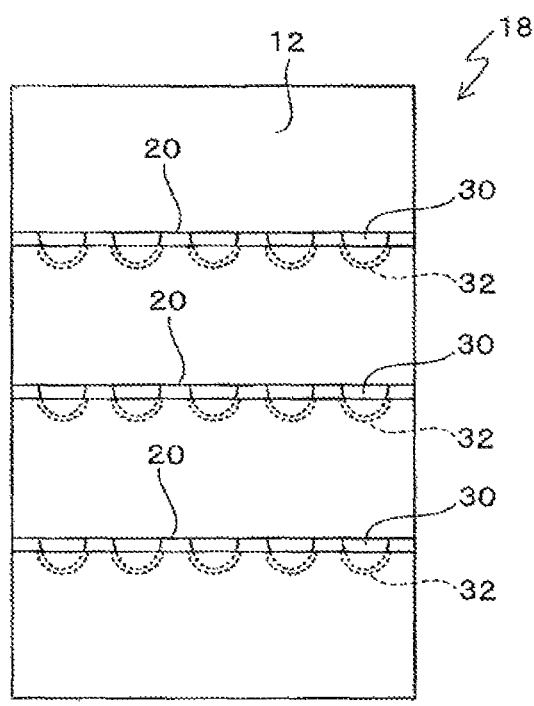
FIG. 5 is a plan view of a block in which a plurality of protrusions and recesses is provided at intervals in the longitudinal direction of the sipes.

When both ends in the longitudinal direction of the sipes 20 connect with the longitudinal grooves 14, as shown in FIGS. 1 to 3, the protrusions 30 and the recesses 32 may be provided at one end only in the longitudinal direction of the sipes 20, or, they may be provided at both ends in the longitudinal direction of the sipes 20, or, as shown in FIG. 5, in addition to the protrusions 30 and the recesses 32 provided at the ends that connect to the longitudinal grooves 14, a plurality of the protrusions 30 and the recesses 32 may be provided at intervals in the longitudinal direction of the sipes 20.

Figure 6A:
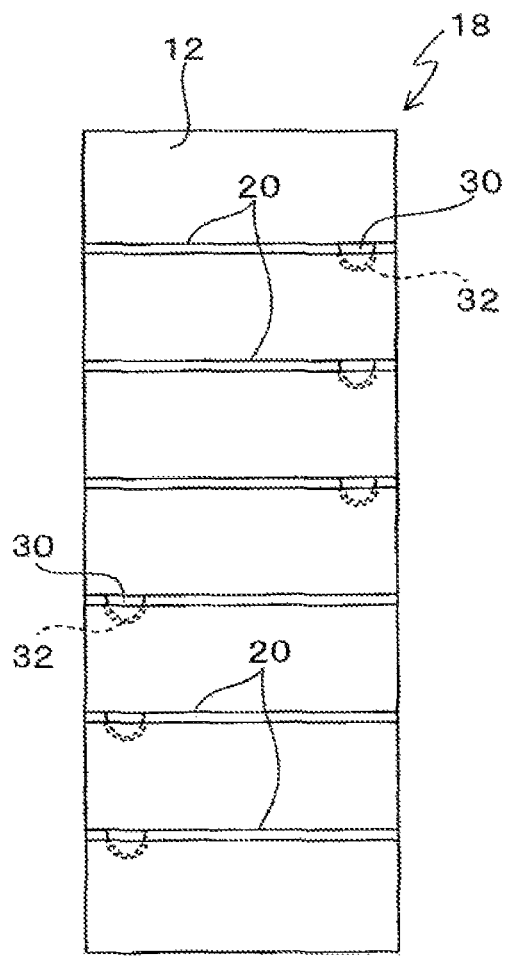
FIG. 6A is a plan view of a block in which at one end in the block width direction three sipes with a protrusion and recess are provided along the tire circumferential direction.

When both ends in the longitudinal direction of the sipes 20 connect with the longitudinal grooves 14, and the protrusions 30 and recesses 32 are provided at one end only of the sipes 20 that connect with the longitudinal grooves 14, if not more than three ends of the sipes 20 where the protrusion 30 and the recess 32 are provided are arranged consecutively, at one end in the width direction of the blocks 18, as shown in FIG. 6A, then the orientations of the water channel directions formed by the sipes 20 are efficiently arranged within the blocks 18, so the water film removal effect is improved, which has the advantage that the steering stability on dry road surfaces is maintained, and, the traction performance on snowy and icy road surfaces and wet road surfaces is improved.

Figure 6B:
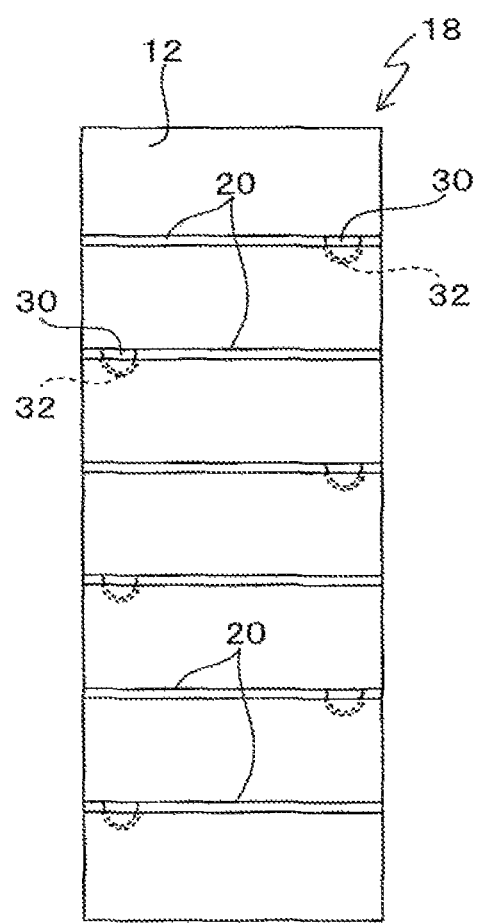
FIG. 6B is a plan view of a block in which at one end in the block width direction the end of a sipe with a protrusion and recess and the end of a sipe with no protrusion and recess are arranged alternately in the tire circumferential direction.

In this case, if as shown in FIG. 6B, at one end in the width direction of the blocks 18, ends of the sipes 20 at which the protrusion 30 and the recess 32 are provided, and ends of the sipes 20 at which the protrusion 30 and the recess 32 are not provided are arranged alternately, then the orientations of the water channel directions formed by the sipes 20 are efficiently arranged within the blocks 18, so the water film removal effect is improved, which has the advantage that the steering stability on dry road surfaces is maintained, and, the traction performance on snowy and icy road surfaces and wet road surfaces is improved.

Figures 7A, 7B:
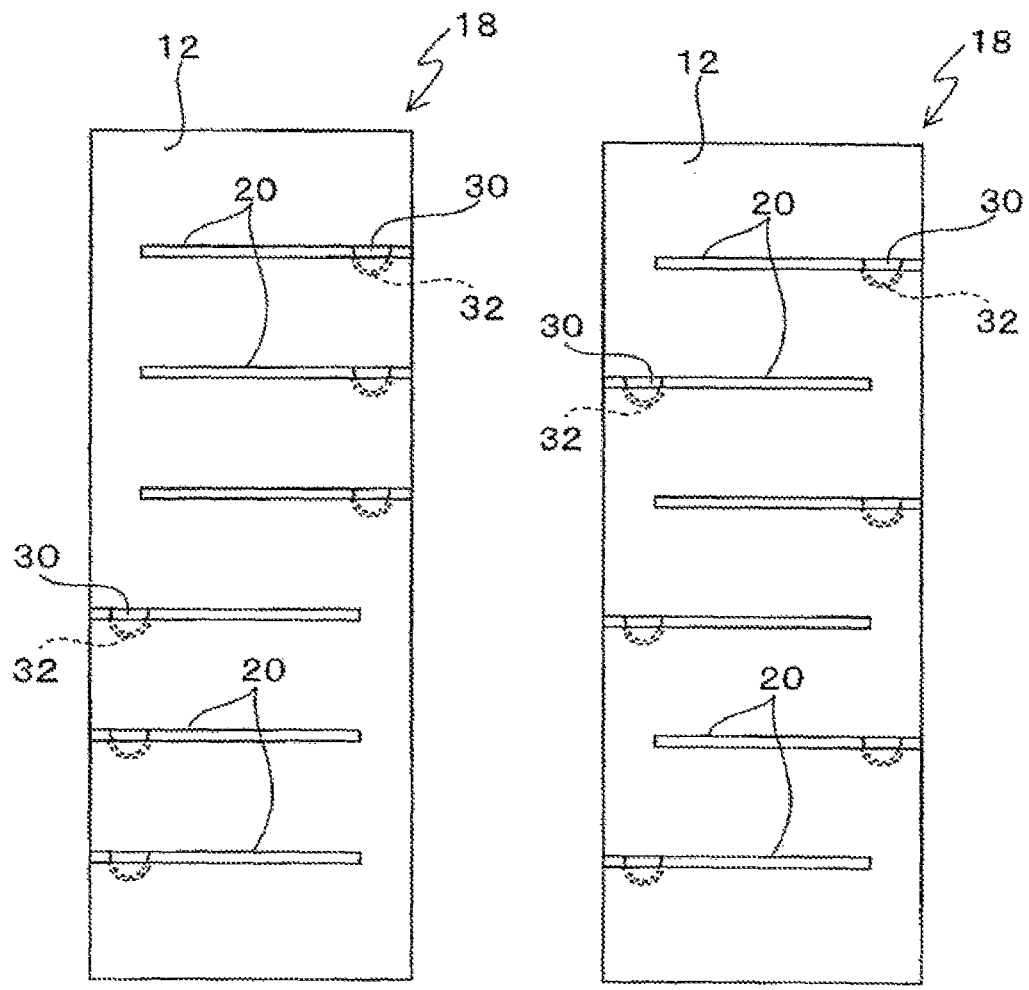
FIG. 7A is a plan view of a block in which at one end in the block width direction three sipes having a protrusion and recess are provided along the tire circumferential direction.
FIG. 7B is a plan view of a block in which at one end in the block width direction the end of a sipe with a protrusion and recess and the closed position of a sipe are arranged alternately in the tire circumferential direction.

For the same reason, when one end in the longitudinal direction of the sipes 20 connects with a longitudinal groove 14, and the other end in the longitudinal direction of the sipes 20 is closed, if the protrusion 30 and the recess 32 are provided only at the end of the sipes 20 that are connected to the longitudinal groove 14, then preferably at one end in the width direction of the blocks 18, not more than three ends of the sipes 20 where the protrusion 30 and the recess 32 are provided are arranged consecutively, as shown in FIG. 7A.

In this case also, if at one end in the width direction of the blocks 18, ends of the sipes 20 at which the protrusion 30 and the recess 32 are provided, and ends of the sipes 20 at which the sipes 20 are not provided are arranged alternately, as shown in FIG. 7B, then the water film removal effect is improved, which has the advantage that the traction performance is improved.

Figure 8:
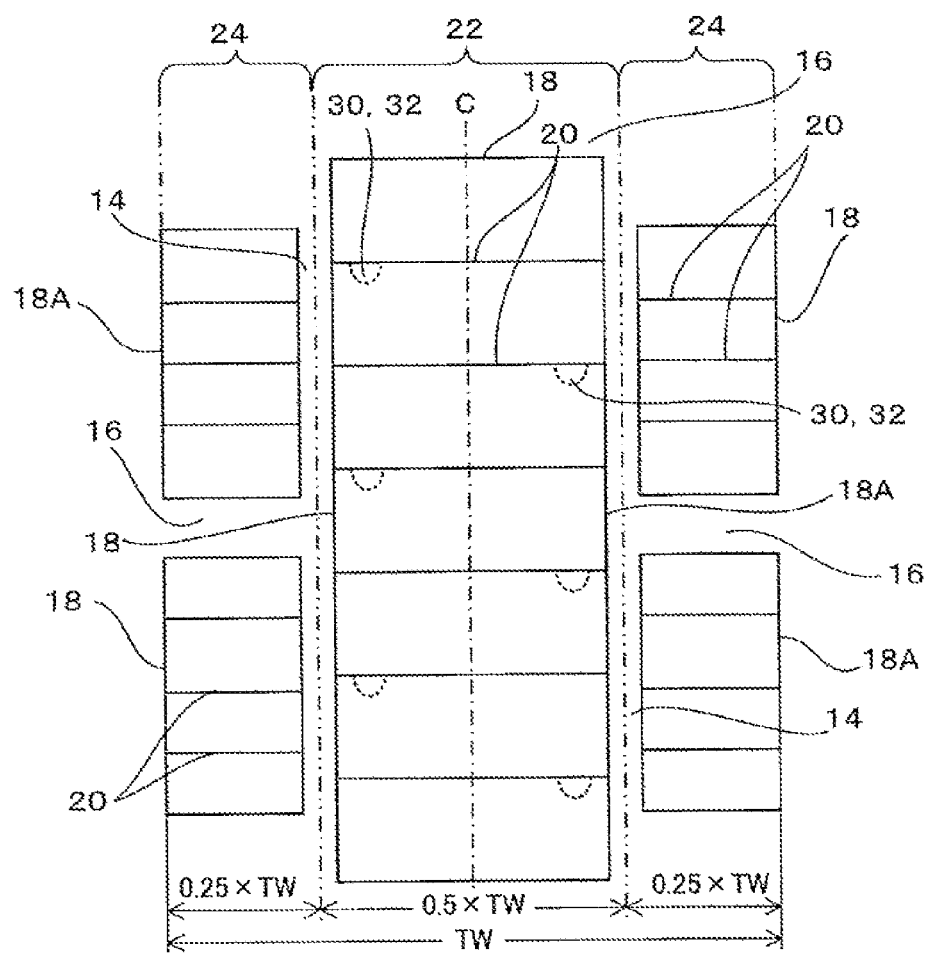
FIG. 8 is a developed view showing the tread pattern of a modified example of a pneumatic tire according to the first embodiment.

In the first embodiment as described above, a case in which the tread center region 22 was a region 70% of the tread contact width TW with the tire equator C as center was described, but as shown in FIG. 8, in a case in which the tread center region 22 is a region 50% of the tread contact width TW with the tire equator C as center, although the traction performance on snowy and icy road surfaces and wet road surfaces is reduced slightly compared with the case where the region is 70%, the steering stability on dry road surfaces is improved. In this case the blocks 18 that constitute a single row of blocks 18A on the tire equator C are considered.

Second Embodiment

Next, a second embodiment is described.

In the following embodiment, the blocks 18 arranged in the tread center region 22 at X % (30≤X≤70) of the tread contact width TW with the tire equator C are formed elongated in the tire circumferential direction with a block ratio (S1/S2) of not less than 1.5 (preferably not less than 2.0); at least one end in the longitudinal direction of the sipes 20 provided in the blocks 18 arranged in the tread center region 22 connects to a longitudinal groove 14; a protrusion 30 and a recess 32 that can engage with each other are provided at the one end in the longitudinal direction of the sipes 20 that connect with the longitudinal grooves 14; and the width of the sipes 20, the shape of the protrusions 30 and recesses 32, and so on, are the same as those of the first embodiment, so the same reference numerals are applied to positions that are the same as the first embodiment, and their descriptions are omitted.

The second embodiment has the same tread pattern as the first embodiment shown in FIG. 1, but the shape of the sipes 20 formed on the tread surface 12 of the blocks 18 arranged in the tread center region 22 of X % (30≤X≤70) of the tread contact width TW with the tire equator C as center is different from that of the first embodiment. In other words, as shown in FIGS. 9A and 9B, a three-dimensional sipe 20A is formed in the middle region in the direction that the sipes 20 extend, and at the two ends in the direction that the sipes 20 extend excluding the middle region, a straight line sipe 20B is formed in which the sipe wall surfaces are formed planar, and there is no amplitude when viewed from the tread surface 12.

Figure 9A:
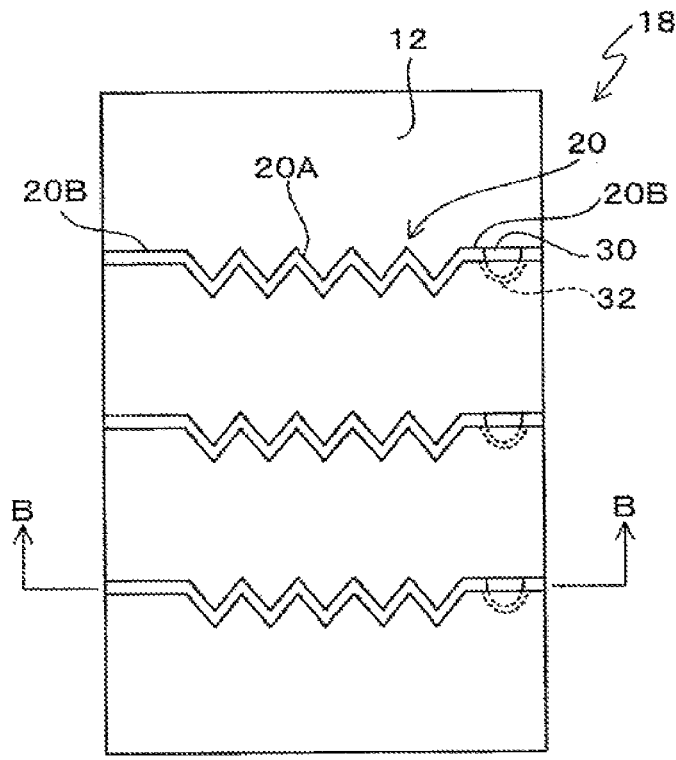
FIG. 9A is a plan view of a block of a pneumatic tire according to a second embodiment.
Figure 9B:
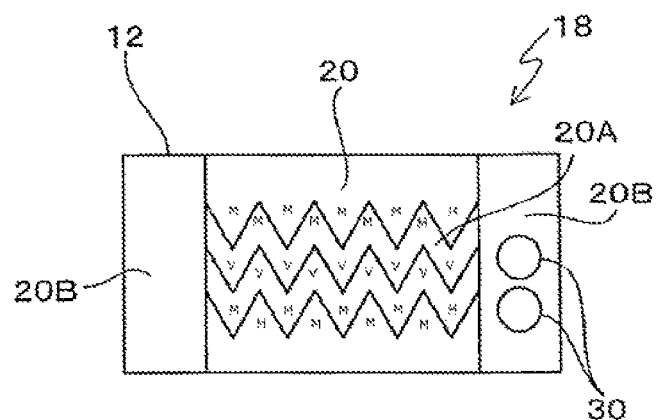
FIG. 9B is a view at the arrows BB in FIG. 9A.

FIG. 9B shows a sipe wall surface viewed from the line BB in FIG. 9A, and in FIG. 9B, "M" indicates a three-sided pyramidal projection, and "V" represents a three-sided pyramidal cavity recess. These "M" and "V" have the same meaning on the drawings of the sipe wall surfaces of three-dimensional sipes in the other embodiments.

Figure 10A:
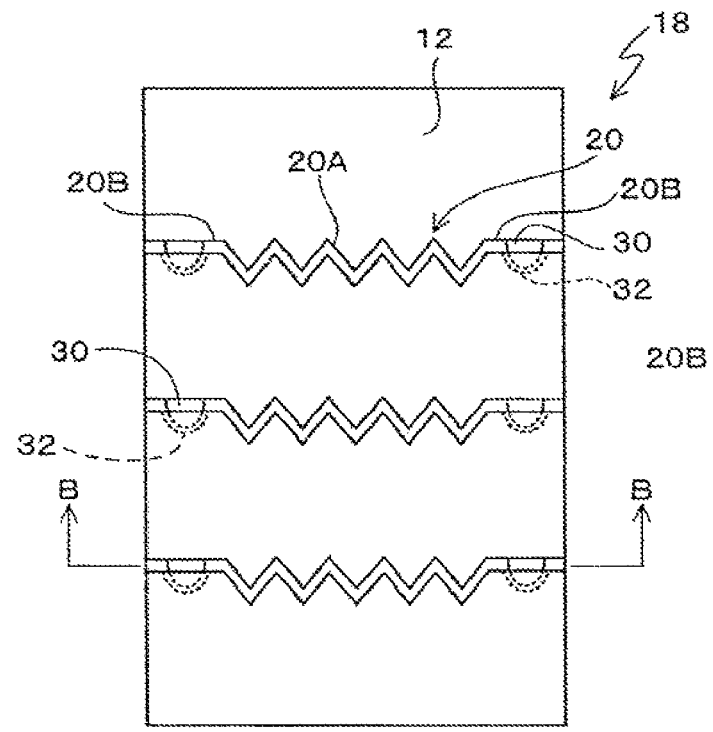
FIG. 10A is a plan view of a block of a modified example of a pneumatic tire according to the second embodiment.
Figure 10B:
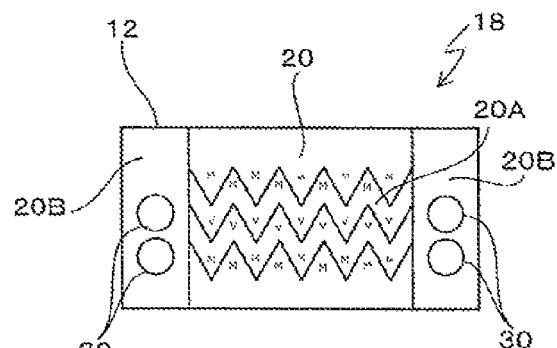
FIG. 10B is a view at the arrows BB in FIG. 10A.

Also, as shown in FIG. 9B, two protrusions 30 and recesses 32 are provided at intervals in the depth direction of the sipes 20 at a location on the one of the straight line sipes 20B, or, as shown in FIGS. 10A and 10B two protrusions 30 and recesses 32 are provided at intervals in the depth direction of the sipes 20 at the locations on both of the straight line sipes 20B.

Here, the three-dimensional sipe 20A is a sipe that extends while curving in the tire width direction, the tire circumferential direction, or the tire radial direction, for example, a pyramid sipe in which the sipe wall surface is formed from a combination of three-sided pyramidal projections can be used.

In the second embodiment, by using the three-dimensional sipe 20A in the middle region in the direction that the sipes 20 extend, it is possible to reduce collapse of the blocks 18 while maintaining the edge effect, which has the advantages that the steering stability is maintained on dry road surfaces, and, the traction performance on snowy and icy road surfaces and wet road surfaces is improved.

Also, at the position where the straight line sipe 20B connects to the longitudinal groove 14, by providing a plurality of protrusions 30 and recesses 32 at intervals in the depth direction of the sipe 20, it is possible to minimize the reduction of rigidity of the blocks 18 without raising the bottom of the sipe 20, and, when the wear has progressed the protrusions 30 and recesses 32 are exposed on the tread surface 12 which is advantageous in terms of increasing the edge effect.

In some cases only one protrusion 30 and recess 32 is provided in the depth direction of the sipes 20, depending on the size of the protrusion 30 and recess 32, or, depending on the depth of the sipes 20.

Third Embodiment

Next, a third embodiment is described.

Figure 11:
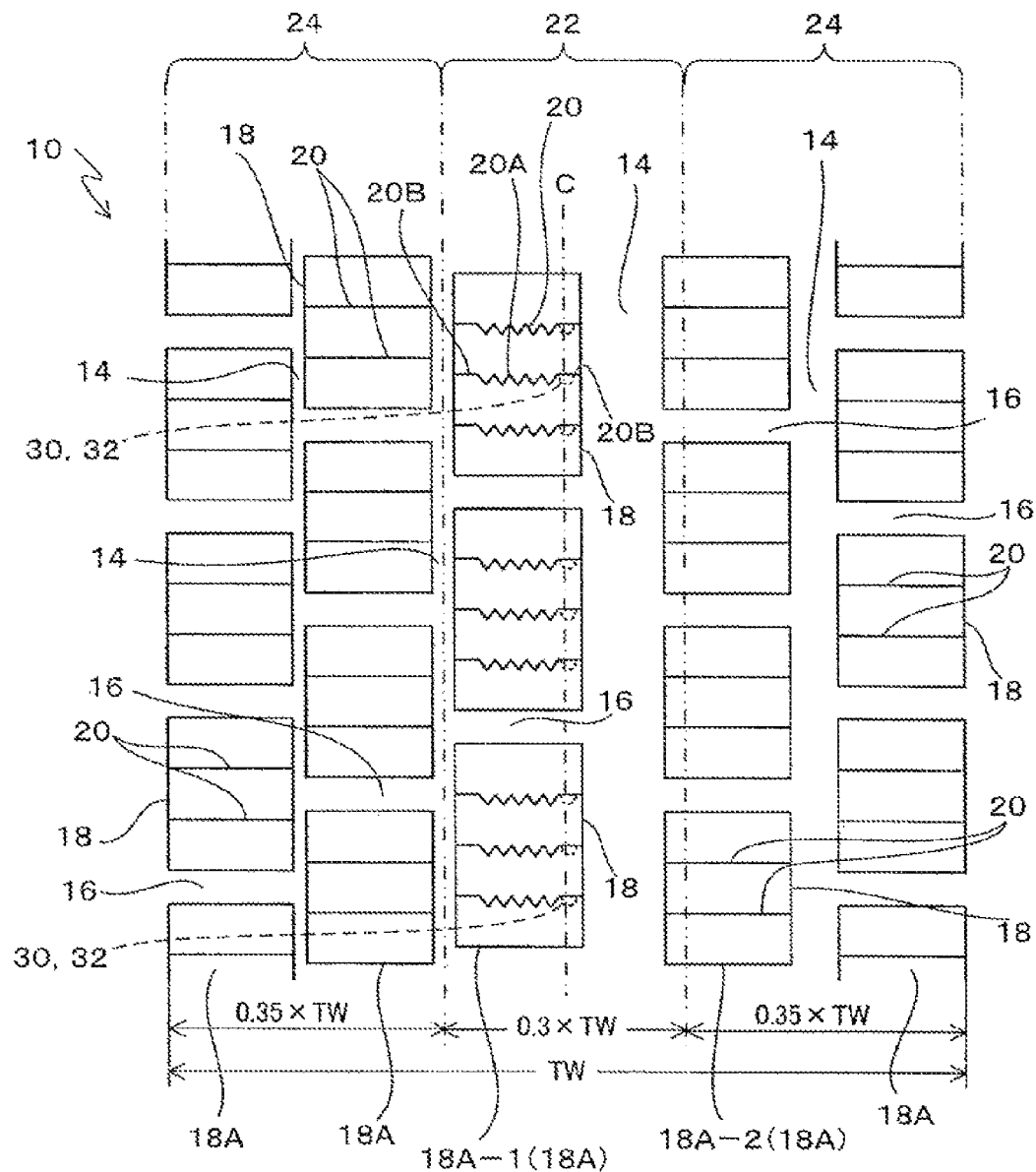
FIG. 11 is a developed view showing the tread pattern of a pneumatic tire according to a third embodiment.

The third embodiment is a modified example of the second embodiment, and as shown in FIG. 11 the tread pattern of the third embodiment differs from that of the first embodiment and the second embodiment. Namely, the third embodiment differs from the second embodiment in that the blocks 18 arranged in the tread center region 22 of X % (30≤X≤70) of the tread contact width TW with the tire equator C as center are blocks 18 arranged in the tread center region 22 of 30% of the tread contact width TW with the tire equator C as center, and the blocks 18 constitute one row of blocks 18A-1 arranged at a location that includes the tire equator C.

The facts that the blocks 18 from which the row of blocks 18A-1 is constituted are elongated in the tire circumferential direction with a block ratio (S1/S2) of not less than 1.5 (preferably not less than 2.0), that at least one end in the longitudinal direction of the sipes 20 provided in the blocks 18 is connected to a longitudinal groove 14, and so on, are the same as for the first embodiment.

Also, the facts that the three-dimensional sipe 20A is formed in the middle region in the direction that the sipes 20 extend, that at both ends in the direction that the sipes 20 extend excluding the middle region, straight line sipes 20B are formed, and that at the position of one of the straight line sipes 20B two are provided at intervals in the depth direction of the sipe 20, as shown in FIG. 9B, or, two are provided at intervals in the depth direction of the sipe 20 at the locations on both straight line sipes 20B as shown in FIGS. 10A and 10B, are the same as for the second embodiment.

In the present technology, the blocks 18 arranged in the tread center region 22 of X % (30≤X≤70) of the tread contact width TW with the tire equator C as center refers to the blocks 18 that are completely included in the tread center region 22 of X % (30≤X≤70) of the tread contact width TW with the tire equator C as center, and does not include the blocks 18 that partially straddle this region.

For example, in the present embodiment, as shown in FIG. 11, the blocks 18 arranged in the tread center region 22 of 30% of the tread contact width TW with the tire equator C as center includes the blocks 18 that constitute the row of blocks 18A-1 which is completely included, but does not include the blocks 18 that constitute the row of blocks 18A-2 that partially straddles the tread center region 22 with the tread equator C as center.

In the third embodiment also, similar to the second embodiment, by using the three-dimensional sipe 20A in the middle region in the direction that the sipes 20 extend, it is possible to reduce collapse of the blocks 18 while maintaining the edge effect, which has the advantages that the steering stability is maintained on dry road surfaces, and, the traction performance on snowy and icy road surfaces and wet road surfaces is improved.

Figures 12A, 12B:
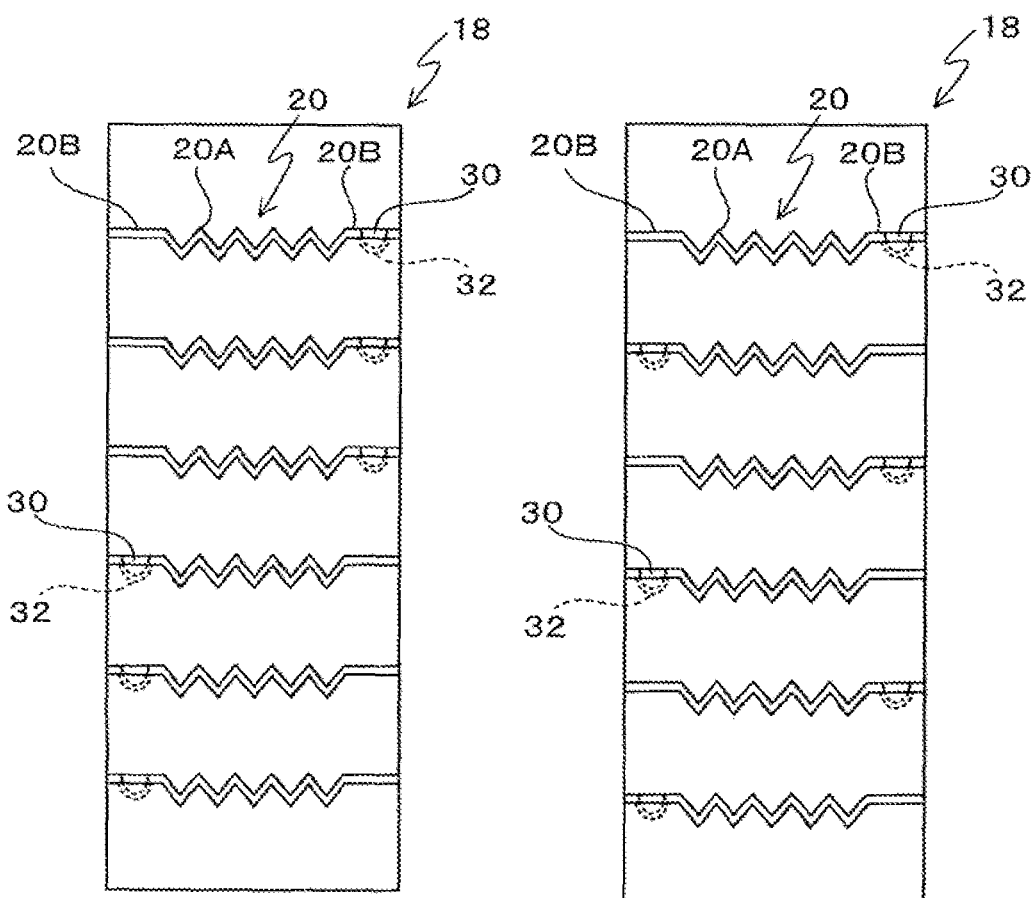
FIG. 12A is a plan view of a block in which at one end in the block width direction three sipes with a protrusion and recess are provided along the tire circumferential direction.
FIG. 12B is a plan view of a block in which at one end in the block width direction the end of a sipe with a protrusion and recess and the end of a sipe with no protrusion and recess are arranged alternately in the tire circumferential direction.

In the second and third embodiments, as shown in FIGS. 9A, 9B, and 11, when the protrusions 30 and recesses 32 are provided at only one straight line sipe 20B, if not more than three ends of the sipes 20 where the protrusion 30 and the recess 32 are provided are arranged consecutively, at one end in the width direction of the blocks 18, as shown in FIG. 12A, then the orientations of the water channel directions formed by the sipes 20 are efficiently arranged within the blocks 18, so the water film removal effect is improved, which has the advantage that the steering stability on dry road surfaces is maintained, and, the traction performance on snowy and icy road surfaces and wet road surfaces due to the sipes 20 is improved.

In this case, if as shown in FIG. 12B, at one end in the width direction of the blocks 18, ends of the sipes 20 at which the protrusion 30 and the recess 32 are provided, and ends of the sipes 20 at which the protrusion 30 and the recess 32 are not provided are arranged alternately, then the water film removal effect is improved, which has the advantage that the steering stability on dry road surfaces is maintained and the traction performance on snowy and icy road surfaces and wet road surfaces is improved.

Fourth Embodiment

Next, a fourth embodiment is described.

Figure 13A:
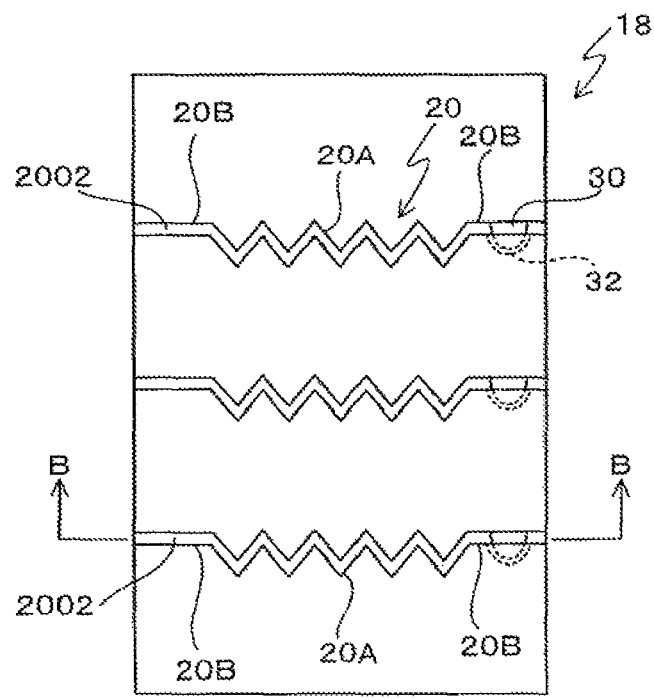
FIG. 13A is a plan view of a block of a pneumatic tire according to a fourth embodiment.
Figure 13B:
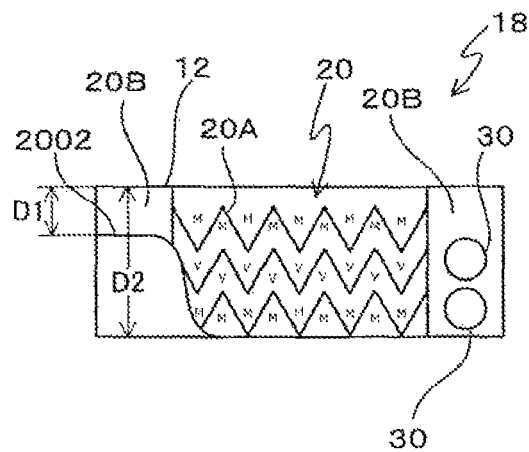
FIG. 13B is a view at the arrows BB in FIG. 13A.

The fourth embodiment is a modified example of the second and third embodiments, as shown in FIGS. 13A and 13B, and is similar to the second and third embodiment in that two protrusions 30 and recesses 32 are provided at intervals in the depth direction of the sipes 20 in one of the straight line sipes 20B of the two straight line shaped sipes 20B at the ends of the three-dimensional sipe 20A, but differs from the second and third embodiment in that the depth D1 of the other straight line sipe 20B is made shallower so as to satisfy the relationship equation D2×0.3≤D1≤D2×0.5, where D2 is the greatest depth of the sipe 20, and the symbol 2002 indicates the bottom surface of the sipe 20 that is raised.

In this case, the bottom of the straight line sipe 20B is raised to satisfy the relationship equation D2×0.3≤D1≤D2×0.5 in order to maintain the block rigidity at the position of the sipes 20 with no protrusions 30 and recesses 32 and ensure the steering stability on dry road surfaces.

In some cases only one protrusion 30 and recess 32 is provided in the depth direction of the sipes 20, depending on the size of the protrusion 30 and recess 32, or, depending on the depth of the sipes 20.

According to the fourth embodiment, similar to the second and third embodiments, it is possible to reduce collapse of the blocks 18 while maintaining the edge effect and water drainage performance, which has the advantages that the steering stability is maintained on dry road surfaces, and, the traction performance on snowy and icy road surfaces and wet road surfaces is improved, and also has the advantage that the amount of edge is maintained when wear has progressed.

Also, in the fourth embodiment, a plurality of sipes 20 is provided at intervals in the depth direction at one of the straight line sipes 20B, and the bottom is raised at the other straight line sipe 20B, so when wear has progressed to the line BB shown in FIG. 14A, even though the straight line sipe 20B with the raised bottom is lost, as shown in FIG. 14B, the protrusions 30 and recesses 32 appear on the tread surface 12, so the amount of edge from the protrusions and recesses can be provided, which has the advantages that the steering stability is maintained on dry road surfaces, and, the traction performance on snowy and icy road surfaces and wet road surfaces due to the sipes 20 is improved.

In this case, as shown in FIG. 15, preferably the sum of the depth H1 from the tread surface 12 to the protrusion 30 or recess 32 located on the upper side within the sipe 20 and the depth H2 from the tread surface 12 to the protrusion 30 or recess 32 located on the lower side within the sipe 20 is greater than the depth H3 of the sipe 20. In other words, when H1+H2>H3, even when wear has progressed and the straight line sipe 20B with the raised bottom is lost, the amount of edge from the protrusions 30 and recesses 32 can be provided, which has the advantages that the steering stability is maintained on dry road surfaces, and, the traction performance on snowy and icy road surfaces and wet road surfaces due to the sipes 20 is improved.

Figure 16A:
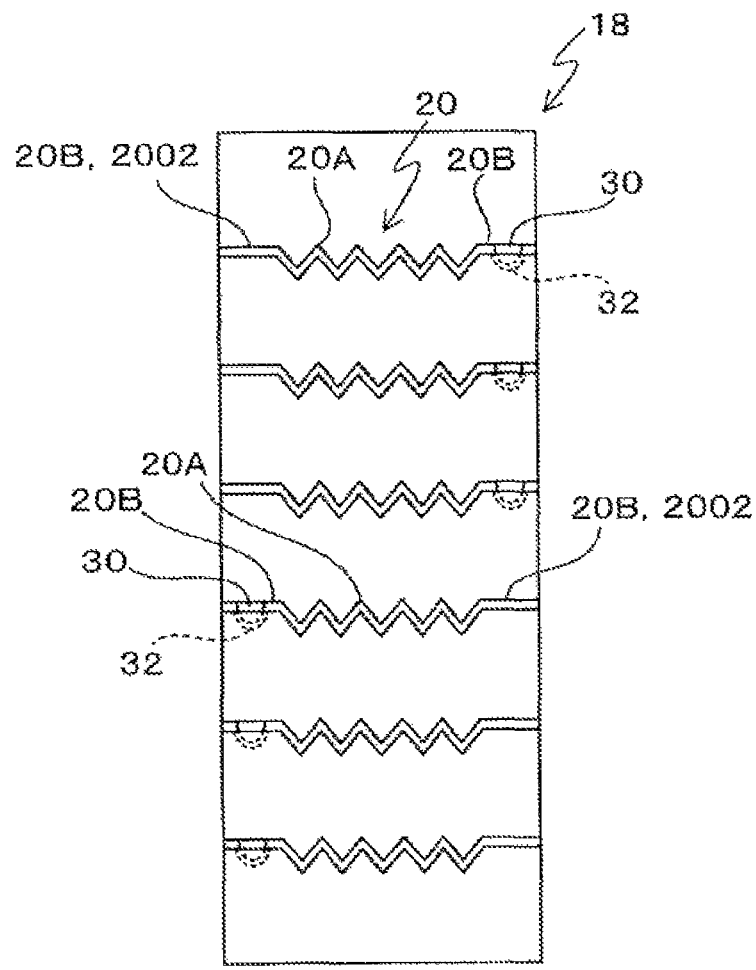
FIG. 16A is a plan view of a block in which three sipes are provided along the tire circumferential direction with a protrusion and recess provided at one end in the block width direction.

In the fourth embodiment, if not more than three ends of the sipes 20 where the protrusion 30 and the recess 32 are provided are arranged consecutively, as shown in FIG. 16A, at one end in the width direction of the blocks 18, then the orientations of the water channel directions formed by the sipes 20 are efficiently arranged within the blocks 18, so the water film removal effect is improved, which has the advantage that the steering stability on dry road surfaces is maintained, and, the traction performance on snowy and icy road surfaces and wet road surfaces due to the sipes 20 is improved.

Figure 16B:
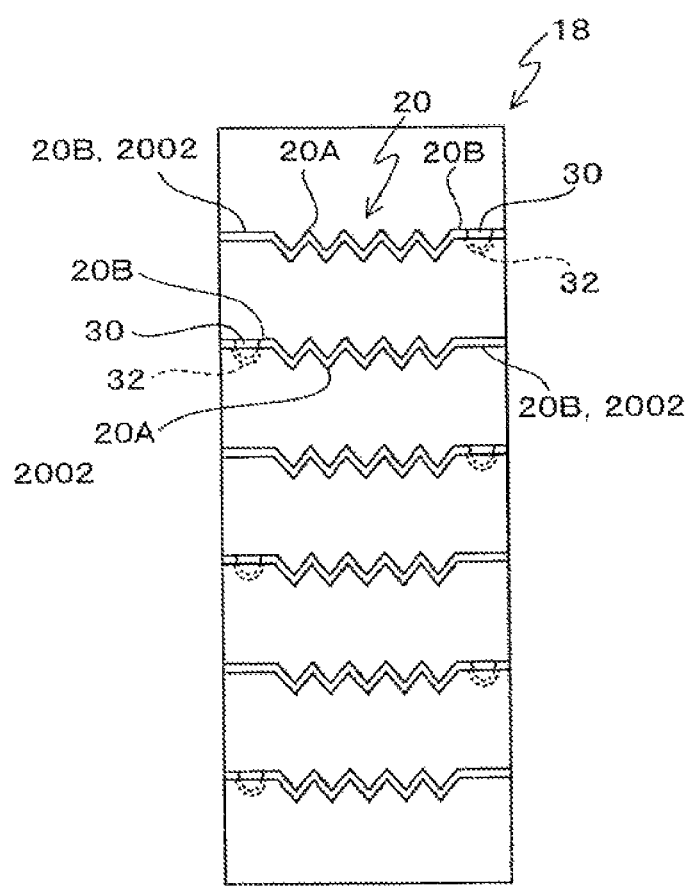
FIG. 16B is a plan view of a block in which at one end in the block width direction the end of a sipe with a protrusion and recess and the end of a sipe with no protrusion and recess provided are arranged alternately in the tire circumferential direction.
Figure 16C:
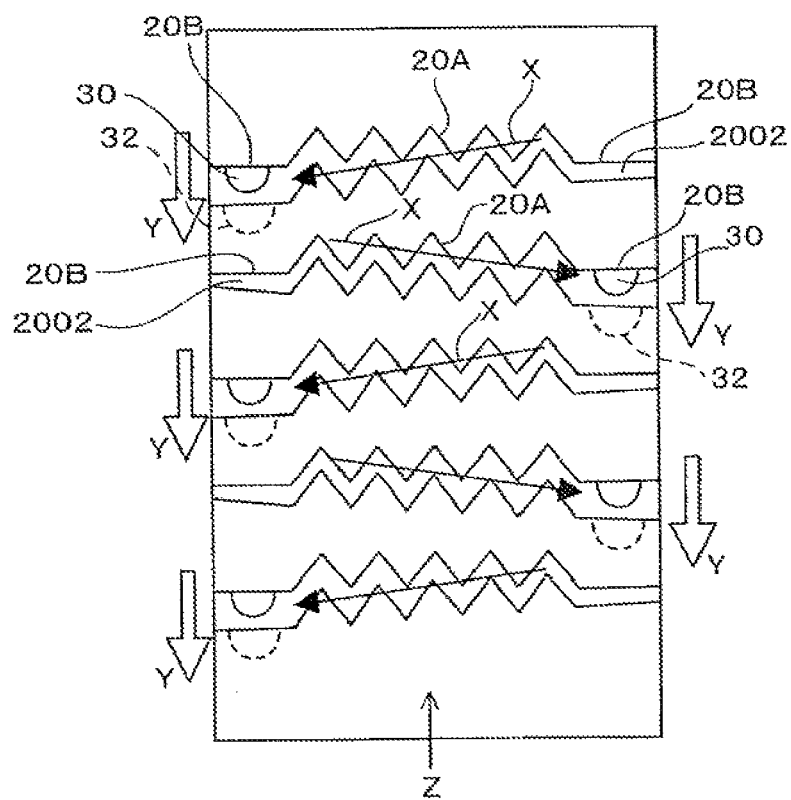
FIG. 16C is an explanatory diagram showing the portions of a block that sandwich the sipes when they collapse together at the ends in the width direction of the block.

In this case, if as shown in FIG. 16B, at one end in the width direction of the blocks 18, ends of the sipes 20 at which the protrusion 30 and the recess 32 are provided, and ends of the sipes 20 with raised bottoms are arranged alternately, the portions of the blocks that are sandwiched the sipes 20 collapse alternately at the ends in the width direction of the blocks 18, so the direction X that the water film is wiped is the opposite orientation for each sipe 20 as shown in FIG. 16C, so the water film removal effect is improved, which has the advantage that the steering stability on dry road surfaces is maintained, and, the traction performance on snowy and icy road surfaces and wet road surfaces is improved. In FIG. 16C, the symbol Y indicates the driving force, and the symbol Z indicates the direction of movement of the vehicle.

The following is a description of Working Examples 1 to 4 with reference to Tables 1 to 4.

In the following working examples, 195/65R15 radial studless tires having the plurality of blocks 18 partitioned by the longitudinal grooves 14 and the lateral grooves 16 on the tread surface 12, and the plurality of sipes 20 extending in the tire width direction provided at intervals in the tire circumferential direction on the tread surface of each block 18 were fitted to 15×6JJ rims, the internal pressure of each tire was 210 kPa, the tires were fitted to the four wheels of a 2000 cc displacement RV vehicle, and for the comparative examples and test examples tests were carried out for the traction performance on wet road surfaces, traction performance on icy road surfaces, traction performance on snowy road surfaces, and steering stability on dry road surfaces.

For the traction performance on wet road surfaces, traction performance on icy road surfaces, and traction performance on snowy road surfaces, the traction was measured when the slip ratio between the test vehicle and the road surface was 50% when the test vehicle was traveling at 10 km/h, and for Working Example 1 in Table 1 Comparative Example 2 was given an index of 100, for Working Example 2 in Table 2 Comparative Example 1 was given an index of 100, for Working Example 3 in Table 3 and Working Example 4 in Table 4 Test Example 2 was given an index of 100, and the comparison was carried out. Larger index values indicate superior traction performance.

For the steering stability on dry road surfaces, a feeling evaluation of steering stability when driving around a test course was carried out by five test drivers, and their average value was obtained. For Working Example 1 in Table 1 Comparative Example 2 was given an index of 100, for Working Example 2 in Table 2 Comparative Example 1 was given an index of 100, for Working Example 3 in Table 3 Test Example 3 was given an index of 100, and for Working Example 4 in Table 4 Test Example 2 was given an index of 100, and the comparison was carried out. Larger index values indicate superior steering stability on dry road surfaces.

Working Example 1

First, Working Example 1 is described with reference to Table 1.

Regarding Working Example 1, in Comparative Examples 11, 12, 14, and Test Examples 11 to 15, the block ratio (S1/S2) of the blocks 18 arranged in the tread center region 22 was 1.5, in Comparative Example 13 the block ratio (S1/S2) of the blocks 18 arranged in the tread shoulder regions 24 was 1.5, the width W of the sipes 20 provided in the blocks 18 was 0.4 mm, their depth D was 6 mm, they were straight line sipes that connected to the longitudinal grooves 14 at both ends, and the height of the protrusions 30 provided in the sipes 20 was 1 mm in common.

Comparative Example 11

Comparative Example 11 had a tread pattern the same as that in FIG. 1, but the tread center region 22 in FIG. 1 was extended from 70% of the tread contact width TW to 80%.

The width of the blocks 18 arranged in the tread center region 22 of 80% the tread contact width TW was 55 mm, and three protrusions 30 and recesses 32 were provided at intervals in the depth direction as shown in FIGS. 1 and 2 on the ends in the longitudinal direction furthest from the tire equator C of the sipes 20 of the blocks 18.

Comparative Example 12

In Comparative Example 12, the tread center region was changed from 80% to 70% of the tread contact width TW with the tire equator C as the center, so the tread pattern was as shown in FIG. 1. It differed from Comparative Example 11 in that protrusions 30 and recesses 32 were not provided in the sipes 20, and all the other parameters were the same as Comparative Example 11.

Comparative Example 13

Comparative Example 13 differs from Comparative Example 12 in that protrusions 30 and recesses 32 are provided at five locations at intervals in the longitudinal direction of the sipes 20, and at each location three are provided at intervals in the depth direction in the blocks 18 that were 25 mm wide arranged in the tread shoulder regions 24, and all other parameters were the same as Comparative Example 12.

Test Example 11

In Test Example 11, three protrusions 30 and recesses 32 are provided at intervals in the depth direction as shown in FIG. 2 at the ends in the longitudinal direction furthest from the tire equator C of the sipes 20 of the blocks 18 arranged in the tread center region 22 of Comparative Example 12. All other parameters were the same as Comparative Example 12.

Test Example 12

Test Example 12 differs from Test Example 11 in that the protrusions 30 and recesses 32 of Test Example 11 were provided not only at the end in the longitudinal direction of the sipes 20, but as shown in FIG. 5, were also provided at five locations at intervals in the longitudinal direction of the sipes 20, and at each location three protrusions 30 and recesses 32 were provided at intervals in the depth direction, and all other parameters were the same as Test Example 11.

Test Example 13

Test Example 13 had blocks 18 of width 135 mm arranged in the tread center region 22 of 50% the tread contact width TW with the tire equator C as center, in the tread pattern shown in FIG. 8, and three protrusions 30 and recesses 32 were provided at intervals in the depth direction at the ends in the longitudinal direction furthest from the tire equator C of the sipes 20 of these blocks 18.

Test Example 14

Test Example 14 differed from Test Example 13 in that the protrusions 30 and recesses 32 of Test Example 13 were provided not only at the end in the longitudinal direction of the sipes 20, but as shown in FIG. 5, were also provided at five locations at intervals in the longitudinal direction of the sipes 20, and at each location three protrusions 30 and recesses 32 were provided at intervals in the depth direction, and all other parameters were the same as Test Example 13.

Test Example 15

Test Example 15 had blocks 18 of width 20 mm arranged in the tread center region 22 of 30% the tread contact width TW with the tire equator C as center, in the tread pattern shown in FIG. 11, and three protrusions 30 and recesses 32 were provided at intervals in the depth direction at the ends in the longitudinal direction furthest from the tire equator C of the sipes 20 of these blocks 18.

Test Example 16

Test Example 16 differed from Test Example 15 in that the protrusions 30 and recesses 32 of Test Example 15 were provided not only at the end in the longitudinal direction of the sipes 20, but as shown in FIG. 5, were also provided at five locations at intervals in the longitudinal direction of the sipes 20, and at each location three protrusions 30 and recesses 32 were provided at intervals in the depth direction, and all other parameters were the same as Test Example 15.

Comparative Example 14

In Comparative Example 14, the tread center region was changed from 30% to 20% the tread contact width TW with the tire equator C as the center, and the tread pattern was the same as shown in FIG. 11. Blocks 18 of width 14 mm were arranged in the tread center region 22 of 20% the tread contact width TW width the tire equator C as center, and three protrusions 30 and recesses 32 were provided at intervals in the depth direction at the ends in the longitudinal direction furthest from the tire equator C of the sipes 20 of these blocks 18.

TABLE 1

| | Comparative Example 11 | Comparative Example 12 | Comparative Example 13 |
|---|---|---|---|
| Block ratio (S1/S2) | 1.5 | 1.5 | 1.5 |
| Tread center region (%) | 80 | 70 | 70 |
| Protrusions and recesses — One end in the longitudinal direction of the sipes of the blocks of the tread center region | Present | — | — |
| 5 locations at intervals in the longitudinal direction of the sipes of the blocks of the tread center region | — | — | — |
| Plurality of locations at intervals in the sipe longitudinal direction in the blocks of the tread shoulder regions | — | — | Present |
| Wet road surface traction performance | 105 | 100 | 101 |

TABLE 1-continued

|  | | | |
|---|---|---|---|
| Icy road surface traction performance | 105 | 100 | 101 |
| Snowy road surface traction performance | 105 | 100 | 101 |
| Dry road surface steering stability | 95 | 100 | 100 |

|  | Test Example 11 | Test Example 12 | Test Example 13 | Test Example 14 |
|---|---|---|---|---|
| Block ratio (S1/S2) | 1.5 | 1.5 | 1.5 | 1.5 |
| Tread center region (%) | 70 | 50 | 50 | 70 |
| Protrusions and recesses — One end in the longitudinal direction of the sipes of the blocks of the tread center region | Present | — | Present | — |
| 5 locations at intervals in the longitudinal direction of the sipes of the blocks of the tread center region | — | Present | — | Present |
| Plurality of locations at intervals in the sipe longitudinal direction in the blocks of the tread shoulder regions | — | — | — | — |
| Wet road surface traction performance | 105 | 107 | 104 | 105 |
| Icy road surface traction performance | 105 | 107 | 104 | 105 |
| Snowy road surface traction performance | 105 | 107 | 104 | 105 |
| Dry road surface steering stability | 102 | 102 | 106 | 106 |

|  | Test Example 15 | Test Example 16 | Comparative Example 14 |
|---|---|---|---|
| Block ratio (S1/S2) | 1.5 | 1.5 | 1.5 |
| Tread center region (%) | 30 | 30 | 20 |
| Protrusions and recesses — One end in the longitudinal direction of the sipes of the blocks of the tread center region | Present | — | Present |
| 5 locations at intervals in the longitudinal direction of the sipes of the blocks of the tread center region | — | Present | — |
| Plurality of locations at intervals in the sipe longitudinal direction in the blocks of the tread shoulder regions | — | — | — |
| Wet road surface traction performance | 104 | 104 | 102 |
| Icy road surface traction performance | 104 | 104 | 102 |
| Snowy road surface traction performance | 104 | 104 | 102 |
| Dry road surface steering stability | 106 | 106 | 101 |

Results for Working Example 1

From Comparative Examples 11 and 12 and Test Examples 11 to 16, it has been shown that making the tread center region 22 from 30% to 70% of the tread contact width TW with the tire equator C as center has the advantage that the wet road surface traction performance, the icy road surface traction performance, and the snowy road traction performance are improved while maintaining the steering stability on dry road surfaces.

From Comparative Examples 12 and 13 and Test Examples 11 and 12, it has been shown that providing the protrusions 30 and recesses 32 in the sipes 20 of the blocks 18 of the tread center region 22 has the advantage that the wet road surface traction performance, the icy road surface traction performance, and the snowy road traction performance are improved while maintaining the steering stability on dry road surfaces.

From the Test Examples 11 and 12 and Test Examples 13 and 14, it has been shown that by making the tread center region 22 from 70% to 50% of the tread contact width TW with the tire equator C as center, although the wet road surface traction performance, the icy road surface traction performance, and the snowy road surface traction performance are slightly reduced, the steering stability on dry road surfaces is improved.

From Comparative Examples 11 and 14 and Test Examples 15 and 16, it has been shown that by making the tread center region 22 30% of the tread contact width TW with the tire equator C as center, compared with the 80% and 20% cases, there is the advantage that the wet road surface traction performance, icy road surface traction performance, and the snowy road traction surface performance are improved, while maintaining the steering stability on dry road surfaces.

Working Example 2

Working Example 2 is described with reference to Table 2.

Regarding Working Example 2, in all of Comparative Examples 21 and 22 and Test Examples 21 to 28, the tread center region 22 is 70% of the tread contact width TW with the tire equator C as center, blocks 18 with width 45 mm were arranged in the tread pattern shown in FIG. 1, the width W of the sipes 20 provided in the blocks 18 was 0.4 mm, their depth D was 6 mm, and they were straight line sites that connected with the longitudinal grooves 14 at both ends in the direction they extended, in common.

Comparative Example 21

In Comparison Example 21, the block ratio (S1/S2) of the blocks 18 arranged in the tread pattern shown in FIG. 1 was 1.3, three protrusions 30 and recesses 32 were provided at intervals in the depth direction at the ends in the longitudinal direction farthest from the tire equator C of the sipes 20 of the blocks 18 arranged in the tread center region 22, as shown in FIGS. 1 and 2, and the height of the protrusions 30 was 1 mm.

Comparative Example 22

Comparative Example 22 differed from Comparative Example 21 in that protrusions 30 and recesses 32 were provided not only at the ends in the longitudinal direction of the sipes 20, but also were provided at five locations at intervals in the longitudinal direction of the sipes 20, and at each location three protrusions 30 and recesses 32 were provided at intervals in the depth direction, and all other parameters were the same as Comparative Example 21.

Test Example 21

In Test Example 21 the block ratio (S1/S2) of Comparative Example 21 was changed from 1.3 to 1.5, and all other parameters were the same as Comparative Example 21.

Test Example 22

Test Example 22 differed from Test Example 21 in that the protrusions 30 and recesses 32 were provided not only at the ends in the longitudinal direction of the sipes 20, but also at five locations at intervals in the longitudinal direction of the sipes 20, and at each location three protrusions 30 and recesses 32 were provided at intervals in the depth direction, and, the height of the protrusions 30 was changed from 1 mm to 0.5 mm, and all other parameters were the same as Test Example 21.

Test Example 23

In Test Example 23, the block ratio (S1/S2) of Test Example 21 was changed from 1.5 to 2, and the height of the protrusions 30 was changed from 1 mm to 3 mm, and all other parameters were the same as Test Example 21.

Test Example 24

In Test Example 24, the block ratio (S1/S2) of Test Example 22 was changed from 1.5 to 2, and the height of the protrusions 30 was changed from 0.5 mm to 1 mm, and all other parameters were the same as Test Example 22.

Test Example 25

In Test Example 25, the block ratio (S1/S2) of Test Example 23 was changed from 2 to 3, and the height of the protrusions 30 was changed from 3 mm to 1 mm, and all other parameters were the same as Test Example 23.

Test Example 26

In Test Example 26, the block ratio (S1/S2) of Test Example 24 was changed from 2 to 3, and all other parameters were the same as Test Example 22.

Test Example 27

In Test Example 27, the block ratio (S1/S2) of Test Example 25 was changed from 3 to 4, and all other parameters were the same as Test Example 25.

Test Example 28

In Test Example 28, the block ratio (S1/S2) of Test Example 26 was changed from 3 to 4, and all other parameters were the same as Test Example 26.

TABLE 2

| | | Comparative Example 21 | Comparative Example 22 | Test Example 21 |
|---|---|---|---|---|
| Block ratio (S1/S2) | | 1.3 | 1.3 | 1.5 |
| Tread center region (%) | | 70 | 70 | 70 |
| Protrusions and recesses | One end in the longitudinal direction of the sipes of the blocks of the tread center region | Present | — | Present |
| | 5 locations at intervals in the longitudinal direction of the sipes of the blocks of the tread center region | — | Present | — |
| | Height of protrusions (mm) | 1 | 1 | 1 |
| Wet road surface traction performance | | 100 | 101 | 105 |
| Icy road surface traction performance | | 100 | 101 | 105 |
| Snowy road surface traction performance | | 100 | 101 | 105 |
| Dry road surface steering stability | | 100 | 100 | 102 |

| | | Test Example 22 | Test Example 23 | Test Example 24 | Test Example 25 |
|---|---|---|---|---|---|
| Block ratio (S1/S2) | | 1.5 | 2 | 2 | 3 |
| Tread center region (%) | | 70 | 70 | 70 | 70 |
| Protrusions and recesses | One end in the longitudinal direction of the sipes of the blocks of the tread center region | — | Present | — | Present |
| | 5 locations at intervals in the longitudinal direction of the sipes of the blocks of the tread center region | Present | — | Present | — |
| | Height of protrusions (mm) | 0.5 | 3 | 1 | 1 |
| Wet road surface traction performance | | 107 | 110 | 111 | 111 |
| Icy road surface traction performance | | 107 | 110 | 111 | 111 |
| Snowy road surface traction performance | | 107 | 110 | 111 | 111 |
| Dry road surface steering stability | | 102 | 110 | 111 | 111 |

| | Test Example 26 | Test Example 27 | Test Example 28 |
|---|---|---|---|
| Block ratio (S1/S2) | 3 | 4 | 4 |
| Tread center region (%) | 70 | 70 | 70 |

TABLE 2-continued

| | | | | |
|---|---|---|---|---|
| Protrusions and recesses | One end in the longitudinal direction of the sipes of the blocks of the tread center region | — | Present | — |
| | 5 locations at intervals in the longitudinal direction of the sipes of the blocks of the tread center region | Present | — | Present |
| | Height of protrusions (mm) | 1 | 1 | 1 |
| Wet road surface traction performance | | 112 | 112 | 112 |
| Icy road surface traction performance | | 112 | 112 | 112 |
| Snowy road surface traction performance | | 112 | 112 | 112 |
| Dry road surface steering stability | | 112 | 112 | 112 |

Results for Working Example 2

From Comparative Examples 21 and 22 and Test Examples 21 to 24, it has been shown that by making the block ratio (S1/S2) not less than 1.5 has the advantage that the wet road surface traction performance, the icy road surface traction performance, and the snowy road surface traction performance are increased while maintaining the steering stability on dry road surfaces.

From Test Examples 21 to 24, it has been shown that a block ratio (S1/S2) of 2 is more advantageous than 1.5 in terms of improving the wet road surface traction performance, the icy road surface traction performance, and the snowy road surface traction performance while maintaining the steering stability on dry road surfaces.

From Test Examples 23 to 28, it has been shown that when the block ratio (S1/S2) exceeds 2, the increase in steering stability on dry road surfaces, traction performance on the wet road surfaces, traction performance on icy road surfaces, and traction performance on snowy road surfaces do not increase in proportion to the increase in block ratio.

Working Example 3

Working Example 3 is described with reference to Table 3.

In Test Example 31, the tread pattern was as shown in FIG. 11, the block width of the row of blocks 18A-1 arranged in the tread center region 22 of 30% of the tread contact width TW with the tire equator C as center was 20 mm, the block ratio (S1/S2) was 1.5, the width W of the sipes 20 provided in the blocks 18 was 0.4 mm, their depth D was 6 mm, and the sipes were straight-line sipes.

In Test Example 32, the tread pattern was as shown in FIG. 11, the block width of the row of blocks 18A-1 arranged in the tread center region 22 of 30% of the tread contact width TW with the tire equator C as center was 20 mm, and the block ratio (S1/S2) was 1.5. The sipes 20 provided in the blocks 18 were three-dimensional sipes in the middle region, as shown in FIG. 11, with straight line sipes on both sides, the width W of these sipes was 0.4 mm, and their depth was 6 mm. The length of the three-dimensional sipes was 18 mm, and the lengths of the straight line sipes 20B was 1 mm on both sides.

In Test Examples 33 to 38, the tread pattern of all was as shown in FIG. 1, the width of the blocks 18 arranged in the tread center region 22 of 70% of the tread contact width TW with the tire equator C as center was 50 mm, the block ratio (S1/S2) was 1.5, the width W of the sipes 20 provided in the blocks 18 was 0.4 mm, and their depth D was 6 mm.

Also, in Test Examples 32, 37, and 38, the length of the three-dimensional sipes was 48 mm, and the length of the straight line sipes 20B on both sides thereof was 1 mm, in Test Examples 35 and 36, the length of the three-dimensional sipes was 40 mm, and the length of the straight line sipes 20B on both sides thereof was 5 mm.

Test Example 31

In Test Example 31, the sipes 20 were only straight-line sipes, and protrusions 30 and recesses 32 were provided at only one end in the longitudinal direction of the sipes 20.

Test Example 32

In Test Example 32, three-dimensional sipes 20A were formed in the middle region in the direction in which the sipes 20 extend, straight line sipes 20B were formed on both sides thereof, and protrusions 30 and recesses 32 were provided at the location of straight line sipes 20B located at one end in the longitudinal direction of the sipes 20.

Test Example 33

In Test Example 33, the sipes 20 were only straight line sipes, and protrusions 30 and recesses 32 were provided at only one end in the longitudinal direction of the sipes 20.

Test Example 34

In Test Example 34, the sipes 20 were only straight-line sipes, and protrusions 30 and recesses 32 were provided at both ends in the longitudinal direction of the sipes 20.

Test Example 35

In Test Example 35, three-dimensional sipes 20A were formed in the middle region in the direction in which the sipes 20 extend, straight line sipes 20B were formed on both sides thereof, and protrusions 30 and recesses 32 were provided at the location of straight line sipes 20B located at one end in the longitudinal direction of the sipes 20.

Test Example 36

In Test Example 36, three-dimensional sipes 20A were formed in the middle region in the direction in which the sipes 20 extend, straight line sipes 20B were formed on both sides thereof, and protrusions 30 and recesses 32 were provided at the location of straight line sipes 20B located at both ends in the longitudinal direction of the sipes 20.

Test Example 37

In Test Example 37, three-dimensional sipes 20A were formed in the middle region in the direction in which the sipes 20 extend, straight line sipes 20B were formed on both sides thereof, and protrusions 30 and recesses 32 were provided at each of the locations of straight line sipes 20B located at both ends in the longitudinal direction of the sipes 20.

Test Example 38

In Test Example 38, three-dimensional sipes 20A were formed in the middle region in the direction in which the sipes 20 extend, straight line sipes 20B were formed on both sides thereof, protrusions 30 and recesses 32 were provided at the location of straight line sipes 20B located at one end in the longitudinal direction of the sipes 20, the depth D1 of the straight line sipes 20B located at the other end in the longitudinal direction of the sipes 20 was made shallower so that the depth satisfied the relationship equation D1=D2× 0.3, where D2 is the maximum depth of the sipes 20.

TABLE 3

|  |  | Test Example 31 | Test Example 32 | Test Example 33 | Test Example 34 | Test Example 35 |
|---|---|---|---|---|---|---|
|  | Block ratio (S1/S2) | 1.5 | 1.5 | 1.5 | 1.5 | 1.5 |
|  | Tread center region (%) | 30 | 30 | 70 | 70 | 70 |
| Sipe form | Straight line sipe | Present | — | Present | Present | — |
|  | Middle region is a three-dimensional sipe with straight line sipes (length L mm) on both ends thereof | — | Yes (L = 1 mm) | — | — | Yes (L = 5 mm) |
|  | Middle region is a three-dimensional sipe with straight line sipes (length L mm) on both ends thereof, with the bottom raised in one of the straight line sipes | — | — | — | — | — |
| Protrusions and recesses | One end in the longitudinal direction of the sipes | Present | Present | Present | — | Present |
|  | Both ends in the longitudinal direction of the sipes | — | — | — | Present | — |
| Wet road surface traction performance |  | 98 | 100 | 100 | 102 | 105 |
| Icy road surface traction performance |  | 98 | 100 | 100 | 102 | 105 |
| Snowy road surface traction performance |  | 98 | 100 | 100 | 102 | 105 |
| Dry road surface steering stability |  | 102 | 102 | 100 | 102 | 105 |

|  |  | Test Example 36 | Test Example 37 | Test Example 38 |
|---|---|---|---|---|
|  | Block ratio (S1/S2) | 1.5 | 1.5 | 1.5 |
|  | Tread center region (%) | 70 | 70 | 70 |
| Sipe form | Straight line sipe | — | — | — |
|  | Middle region is a three-dimensional sipe with straight line sipes (length L mm) on both ends thereof | Yes (L = 5 mm) | Yes (L = 1 mm) | — |
|  | Middle region is a three-dimensional sipe with straight line sipes (length L mm) on both ends thereof, with the bottom raised in one of the straight line sipes | — | — | Yes (L = 1 mm) |
| Protrusions and recesses | One end in the longitudinal direction of the sipes | — | — | Present |
|  | Both ends in the longitudinal direction of the sipes | Present | Present | — |
| Wet road surface traction performance |  | 106 | 107 | 109 |
| Icy road surface traction performance |  | 106 | 107 | 109 |
| Snowy road surface traction performance |  | 106 | 107 | 109 |
| Dry road surface steering stability |  | 106 | 107 | 109 |

Results for Working Example 3

From Test Examples 31 and 32, it has been shown that when the three-dimensional sipe 20A is formed in the middle region in the direction that the sipes 20 extend, the wet road surface traction performance, the icy road surface traction performance, and the snowy road surface traction performance are improved while maintaining the steering stability on dry road surfaces compared with the case where the sipes 20 are straight line sipes.

From Test Examples 33 and 34 and from Test Examples 35 and 36, it has been shown that when protrusions 30 and recesses 32 are provided at both ends in the longitudinal direction of the sipes 20, the wet road surface traction performance, the icy road surface traction performance, and the snowy road surface traction performance are improved while maintaining the steering stability on dry road surfaces, compared with the case where they are provided at one end in the longitudinal direction of the sipes 20.

From Test Examples 36 and 37, the case where the length of the straight line sipes 20B is 1 mm is advantageous in terms of improving the wet road surface traction performance, the icy road surface traction performance, and the snowy road surface traction performance compared with the case where the length is 5 mm.

From Test Examples 33 to 38, it has been shown that the case in which the three-dimensional sipe 20A is formed in the middle region in the direction that the sipes 20 extend is advantageous in terms of improving the wet road surface traction performance, the icy road surface traction performance, and the snowy road surface traction performance are improved while maintaining the steering stability on dry road surfaces, compared with the case where the sipes 20 are straight line sipes.

From Test Examples 37 and 38, it has been shown that the case in which the bottom of the straight line sipe 20B is raised at the other end in the longitudinal direction of the sipe 20 is advantageous in terms of improving the wet road surface traction performance, the icy road surface traction performance, and the snowy road surface traction performance while maintaining the steering stability on dry road surfaces, compared with the case where the protrusions 30 and the recesses 32 are provided on both ends in the longitudinal direction of the sipes 20.

Working Example 4

Next, Working Example 4 is described with reference to Table 4.

In Working Example 4, the tread patterns in all of Test Examples 41 to 44 were the same as those shown in FIG. 1, the blocks 18 arranged in the tread center region 22 of 70% of the tread contact width TW with the tire equator C as center had a width of 50 mm and a block ratio (S1/S2) of 1.5, the width W of the sipes 20 provided in the blocks 18 was 0.4 mm and their depth D was 6 mm, the length of the three-dimensional sipes was 40 mm, the length of one straight line sipe 20B at which protrusions 30 and recesses 32 were provided located at one end in the longitudinal direction of the sipes 20 was 5 mm, and the depth D1 of the straight line sipe 20B located at the other end in the longitudinal direction of the sipe 20 was made shallower as shown in FIG. 13B.

TABLE 4

|  | Test Example 41 | Test Example 42 | Test Example 43 | Test Example 44 |
| --- | --- | --- | --- | --- |
| Relationship between depth D1 of sipe with raised bottom and depth D2 of deepest sipe | D1 = D2 × 0.1 | D1 = D2 × 0.3 | D1 = D2 × 0.5 | D1 = D2 × 0.7 |
| Wet road surface traction performance | 98 | 100 | 100 | 100 |
| Icy road surface traction performance | 98 | 100 | 100 | 100 |
| Snowy road surface traction performance | 98 | 100 | 100 | 100 |
| Dry road surface steering stability | 100 | 100 | 100 | 98 |

Results for Working Example 4

From Test Examples 41, 42, and 43, when the depth D1 of the straight line sipe 20B located at the other end in the longitudinal direction of the sipe 20 satisfies the relationship D1=D2×0.1, where D2 is the depth of the deepest sipe 20, the effect of improvement in the wet road surface traction performance, icy road surface traction performance, and snowy road surface traction performance is small compared with the case where the relationship equation D1=D2×0.3 or D1=D2×0.5 is satisfied.

Also, from Test Examples 42, 43, and 44, when the depth D1 of the straight line sipe 20B located at the other end in the longitudinal direction of the sipe 20 satisfies the relationship D1=D2×0.7, where D2 is the depth of the deepest sipe 20, the effect of maintenance of steering stability on dry road surfaces is small compared with the case where the relationship equation D1=D2×0.3 or D1=D2×0.5 is satisfied.

What is claimed is:

1. A pneumatic tire in which a plurality of longitudinal grooves is provided on a tread surface extending in a tire circumferential direction at intervals in a tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein the blocks arranged in a tread center region of X % of a tread contact width (30≤X≤70) with a tire equator as a center have a block ratio, which is a ratio of a dimension in a tire longitudinal direction to a dimension in the tire width direction, of not less than 1.5 so that the blocks are elongated in the tire circumferential direction, at least one end in the longitudinal direction of the sipes provided in the blocks arranged in the tread center region connects to a longitudinal groove, at one end in a longitudinal direction of the sipes that connect with the longitudinal groove, a protrusion and a recess that can engage with each other are provided in sipe wall surfaces that face each other constituting the sipe, wherein a second end in a longitudinal direction of the sipes, opposite the one end, is devoid of the protrusion and the recess, the sipes are straight line sipes with no amplitude when viewed from the tread surface, and in addition to the protrusion and recess provided at the one end, a plurality of protrusions and recesses is provided at intervals in the direction that the sipes extend.

2. The pneumatic tire according to claim 1, wherein X satisfies 30≤X≤50.

3. The pneumatic tire according to claim 1, wherein a plurality of rows of blocks constituted from the blocks arranged in the tire circumferential direction is provided at intervals in the tire width direction on the tread surface, and the blocks arranged in the tread center region constitute at least one row of blocks arranged in a position that includes the tire equator.

4. The pneumatic tire according to claim 1, wherein the block ratio is not less than 2.0.

5. The pneumatic tire according to claim 1, wherein a three-dimensional sipe is formed in a middle region in the direction that the sipes extend; and at both ends in the direction that the sipes extend excluding the middle region, straight line sipes are formed with no amplitude when viewed from the tread surface.

6. The pneumatic tire according to claim 5, wherein a length of the straight line sipe is not less than 1 mm and not more than 5 mm.

7. The pneumatic tire according to claim 1, wherein a height of the protrusion is not less than 0.5 mm and not more than 3 mm.

8. The pneumatic tire according to claim 2, wherein a plurality of rows of blocks constituted from the blocks arranged in the tire circumferential direction is provided at intervals in the tire width direction on the tread surface, and the blocks arranged in the tread center region constitute at least one row of blocks arranged in a position that includes the tire equator.

9. The pneumatic tire according to claim 8, wherein the block ratio is not less than 2.0.

10. The pneumatic tire according to claim 9, wherein
at one end in the width direction of the blocks, the sipes that are adjacent to each other in the tire circumferential direction in the blocks are arranged so that the one end of the sipe where the protrusion and recess is provided and the second end of the sipe where the protrusion and recess is not provided are arranged alternately.

11. The pneumatic tire according to claim 9, wherein a three-dimensional sipe is formed in a middle region in the direction that the sipes extend; and at both ends in the direction that the sipes extend excluding the middle region, straight line sipes are formed with no amplitude when viewed from the tread surface.

12. The pneumatic tire according to claim 11, wherein
at one end in a width direction of the blocks, the sipes that are adjacent to each other in the tire circumferential direction in the blocks are arranged so that the one end of the sipe where the protrusion and recess is provided and the second end of the sipe where the protrusion and recess is not provided are arranged alternately.

13. The pneumatic tire according to claim 12, wherein a depth D1 of the straight line sipe at the second end in the direction that the sipes extend is made shallower to satisfy a relationship equation D2×0.3≤D1≤D2×0.5 where D2 is a depth of a deepest sipe.

14. The pneumatic tire according to claim 1, wherein the longitudinal grooves are parallel to the tire circumferential direction and the lateral grooves and the sipes are parallel to the tire width direction.

15. A pneumatic tire in which a plurality of longitudinal grooves is provided on a tread surface extending in a tire circumferential direction at intervals in a tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein
the blocks arranged in a tread center region of X % of a tread contact width (30≤X≤70) with a tire equator as a center have a block ratio, which is a ratio of a dimension in a tire longitudinal direction to a dimension in the tire width direction, of not less than 1.5 so that the blocks are elongated in the tire circumferential direction,
at least one end in the longitudinal direction of the sipes provided in the blocks arranged in the tread center region connects to a longitudinal groove,
at one end in a longitudinal direction of the sipes that connect with the longitudinal groove, a protrusion and a recess that can engage with each other are provided in sipe wall surfaces that face each other constituting the sipe, wherein a second end in a longitudinal direction of the sipes, opposite the one end, is devoid of the protrusion and the recess, and
at one end in the width direction of the blocks, the sipes that are adjacent to each other in the tire circumferential direction in the blocks are arranged so that the one end of the sipe where the protrusion and recess is provided and the second end of the sipe where the protrusion and recess is not provided are arranged alternately.

16. A pneumatic tire in which a plurality of longitudinal grooves is provided on a tread surface extending in a tire circumferential direction at intervals in a tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein
the blocks arranged in a tread center region of X % of a tread contact width (30≤X≤70) with a tire equator as a center have a block ratio, which is a ratio of a dimension in a tire longitudinal direction to a dimension in the tire width direction, of not less than 1.5 so that the blocks are elongated in the tire circumferential direction,
at least one end in the longitudinal direction of the sipes provided in the blocks arranged in the tread center region connects to a longitudinal groove,
at one end in a longitudinal direction of the sipes that connect with the longitudinal groove, a protrusion and a recess that can engage with each other are provided in sipe wall surfaces that face each other constituting the sipe, wherein a second end in a longitudinal direction of the sipes, opposite the one end, is devoid of the protrusion and the recess,
a three-dimensional sipe is formed in a middle region in the direction that the sipes extend; and at both ends in the direction that the sipes extend excluding the middle region, straight line sipes are formed with no amplitude when viewed from the tread surface, and
at one end in a width direction of the blocks, the sipes that are adjacent to each other in the tire circumferential direction in the blocks are arranged so that the one end of the sipe where the protrusion and recess is provided and the second end of the sipe where the protrusion and recess is not provided are arranged alternately.

17. A pneumatic tire in which a plurality of longitudinal grooves is provided on a tread surface extending in a tire circumferential direction at intervals in a tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein the blocks arranged in a tread center region of X % of a tread contact width ($30 \leq X \leq 70$) with a tire equator as a center have a block ratio, which is a ratio of a dimension in a tire longitudinal direction to a dimension in the tire width direction, of not less than 1.5 so that the blocks are elongated in the tire circumferential direction, at least one end in the longitudinal direction of the sipes provided in the blocks arranged in the tread center region connects to a longitudinal groove, at one end in a longitudinal direction of the sipes that connect with the longitudinal groove, a protrusion and a recess that can engage with each other are provided in sipe wall surfaces that face each other constituting the sipe, wherein a second end in a longitudinal direction of the sipes, opposite the one end, is devoid of the protrusion and the recess, a three-dimensional sipe is formed in a middle region in the direction that the sipes extend; and at both ends in the direction that the sipes extend excluding the middle region, straight line sipes are formed with no amplitude when viewed from the tread surface, and a depth D1 of the straight line sipe at the second end in the direction that the sipes extend is made shallower to satisfy a relationship equation $D2 \times 0.3 \leq D1 \leq D2 \times 0.5$ where D2 is a depth of a deepest sipe.

18. The pneumatic tire according to claim 17, wherein at one end in the width direction of the blocks, the sipes that are adjacent to each other in the tire circumferential direction in the blocks are arranged so that the one end of a sipe where the protrusion and recess is provided and the second end of a sipe where the protrusion and recess is not provided are arranged alternately.

19. A pneumatic tire in which a plurality of longitudinal grooves is provided on a tread surface extending in a tire circumferential direction at intervals in a tire width direction, a plurality of lateral grooves is provided extending in a direction that intersects with the longitudinal grooves at intervals in the tire circumferential direction, a plurality of blocks is partitioned by the longitudinal grooves and the lateral grooves, and sipes extending in the tire width direction are provided in the blocks, wherein the blocks arranged in a tread center region of X % of a tread contact width ($30 \leq X \leq 70$) with a tire equator as a center have a block ratio, which is a ratio of a dimension in a tire longitudinal direction to a dimension in the tire width direction, of not less than 1.5 so that the blocks are elongated in the tire circumferential direction, at least one end in the longitudinal direction of the sipes provided in the blocks arranged in the tread center region connects to a longitudinal groove, at one end in a longitudinal direction of the sipes that connect with the longitudinal groove, a protrusion and a recess that can engage with each other are provided in sipe wall surfaces that face each other constituting the sipe, wherein a second end in a longitudinal direction of the sipes, opposite the one end, is devoid of the protrusion and the recess, two protrusions and recesses are provided at intervals in a depth direction of the sipe, and a distance H1 from the tread surface to a center of the protrusion or a center of the recess located on a tread surface side plus a distance H2 from the tread surface to the center of the protrusion or the center of the recess on a sipe bottom side is greater than a depth of the sipe.

* * * * *